(12) United States Patent
Nishida et al.

(10) Patent No.: US 6,255,430 B1
(45) Date of Patent: Jul. 3, 2001

(54) POLYSILANES AND PROCESS FOR PREPARATION OF SAME

(75) Inventors: Ryoichi Nishida, Ikoma; Hiroaki Murase, Kyoto, both of (JP)

(73) Assignee: Osaka Gas Company Limited, Osaka (JP)

( * ) Notice: Subject to any disclaimer, the term of this patent is extended or adjusted under 35 U.S.C. 154(b) by 0 days.

(21) Appl. No.: 09/341,304

(22) PCT Filed: Jan. 7, 1998

(86) PCT No.: PCT/JP98/00017

§ 371 Date: Jul. 8, 1999

§ 102(e) Date: Jul. 8, 1999

(87) PCT Pub. No.: WO98/30618

PCT Pub. Date: Jul. 16, 1998

(30) Foreign Application Priority Data

Jan. 9, 1997 (JP) .................................................. 9-002325

(51) Int. Cl.[7] .............................. C08G 77/00; C07F 7/08
(52) U.S. Cl. .................................. 528/29; 528/10; 528/49; 528/25; 556/430; 556/449
(58) Field of Search ..................................... 556/430, 449; 528/10, 29, 43, 25

(56) References Cited

U.S. PATENT DOCUMENTS 4,822,716 * 4/1989 Onishi et al. ......................... 430/192
5,128,430    7/1992 Tabei et al. .
5,159,042 * 10/1992 Tanaka et al. ......................... 528/14
5,286,891 *  2/1994 Tabei et al. ........................... 556/430
5,359,106 * 10/1994 Tabei et al. ........................... 556/412
5,438,113 *  8/1995 Shimiozawa et al. .................. 528/25

FOREIGN PATENT DOCUMENTS 0506432   9/1992 (EP) .
6-256524  9/1994 (JP) .
6-256525  9/1994 (JP) .

* cited by examiner

*Primary Examiner*—Margaret G. Moore
(74) *Attorney, Agent, or Firm*—Larson & Taylor, PLC

(57) ABSTRACT

The invention is directed to a polysilane represented by the formula (1)

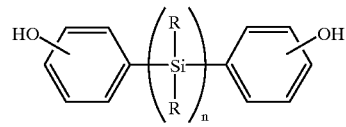

(1)

wherein R is hydrogen atom, alkyl group, aryl group, alkoxy group, amino group or silyl group, R's may be the same or at least two of them may be different from each other; each hydroxyl group is in the p-position or m-position; and n is 2 to 10,000, preferably 13 to 8,500. The polysilane of the invention is important as materials for modified polycarbonates or like engineering plastics, resists or electrophotographic photoreceptors.

8 Claims, 15 Drawing Sheets

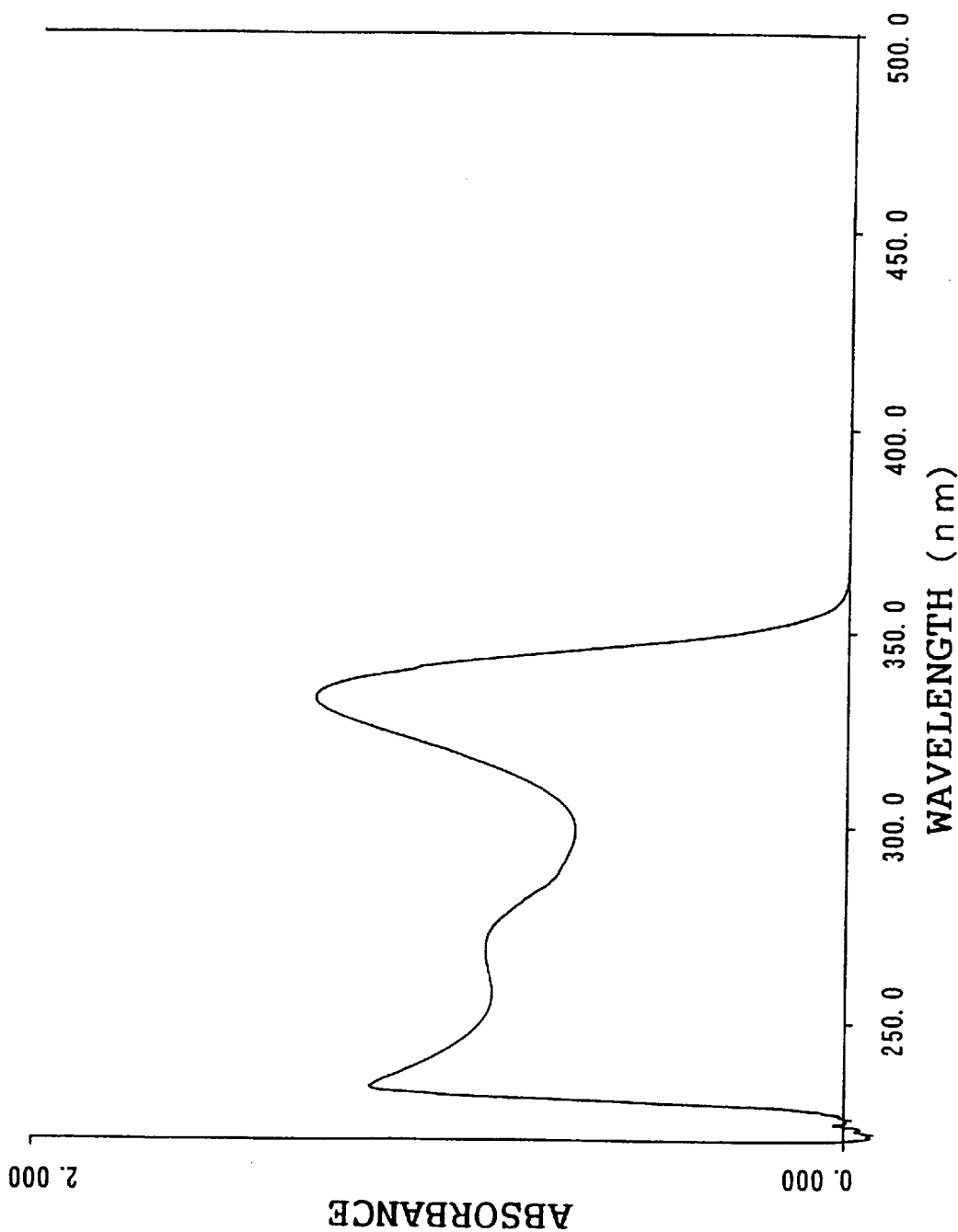

POLYSILANES AND PROCESS FOR PREPARATION OF SAME

TECHNICAL FIELD

The present invention relates to novel polysilanes regarded important as starting materials for engineering plastics such as modified polycarbonates, as materials for resists or as materials for electrophotographic photoreceptors, and to a process for preparing the same.

BACKGROUND ART

Investigations have been made on the use of engineering plastics, e.g. polycarbonate, as a material for hard coat. In fact, some of such plastics have been in actual use. However, bisphenol A polycarbonate is not satisfactory in hardness and has been modified to increase the hardness.

The polysilanes having phenol groups at both ends according to the present invention can be used as a starting material for producing a polycarbonate or polyester having a polysilane skeleton in the main chain. Thus, when the polysilane of the invention is used, a polycarbonate or the like with improved hardness can be prepared and a more useful material for hard coat can be provided. Further the obtained polycarbonate or the like with a polysilane skeleton has a photosensitive property and a charge-transporting property derived from the polysilane and is usable as a new type of hard coat material showing an optoelectronic function.

However, no research has been conducted on such polysilanes with phenol groups at both ends which are useful in producing a modified polycarbonate or the like. No process for preparing the polysilanes is known.

Further it is needless to say that a process was unknown for preparing such polysilanes having phenol groups at both ends wherein the degree of polymerization of polysilane is controlled and phenol groups are introduced at both ends in order to produce a modified polycarbonate or the like having properties optimal for various applications as a hard coat material.

DISCLOSURE OF THE INVENTION

An object of the present invention is to provide a novel polysilane which is important as a starting material for engineering plastics such as modified polycarbonates, as a material for resists or as a material for electrophotographic photoreceptors.

Another object of the invention is to provide a process for preparing such novel polysilane.

In view of the foregoing situation of the prior art, the inventors of this invention conducted extensive research and found out a process for preparing the desired polysilane by reacting a polysilane having halogen atoms at both ends with a Grignard reagent prepared by reacting magnesium with a hydroxyl-protected halogenated phenol or a hydroxyl-protected halogenated phenol derivative, followed by deprotection.

The inventors also discovered a process for preparing a polysilane having phenol groups at both ends in a manner to control the degree of polymerization in the polysilane moiety, the polysilane being useful in producing a modified polycarbonate having properties optimal for various applications as a hard coat material, the process comprising conducting an electrode reaction using a specific metal as the anode or a reduction reaction using a specific metal in the presence of a specific lithium salt and a specific halogenated metal to give a polysilane having halogen atoms at both ends.

According to the present invention, there are provided the following polysilanes having phenol groups at both ends and processes for preparing the same.

1. A polysilane represented by the formula (1)

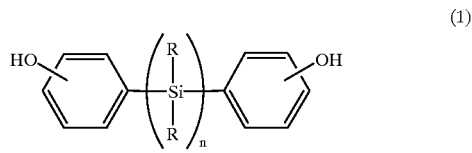

(1)

wherein R is hydrogen atom, alkyl group, aryl group, alkoxy group, amino group or silyl group; R's may be the same or at least two of them may be different from each other; each hydroxyl group is in the p-position or m-position; and n is 2 to 10,000.

2. The polysilane as defined in item 1, wherein n is 5 to 8,500.

3. The polysilane as defined in item 1, wherein n is 13 to 8,500.

4. A process for preparing a polysilane having phenol groups at both ends which is represented by the formula (1)

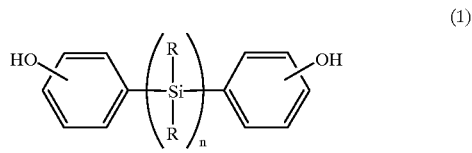

(1)

wherein R is hydrogen atom, alkyl group, aryl group, alkoxy group, amino group or silyl group; R's may be the same or at least two of them may be different from each other; each hydroxyl group is in the p-position or m-position; and n is 2 to 10,000, the process comprising the steps of (a) conducting the Grignard reaction between (i) a polysilane having halogen atoms at both ends which is represented by the formula (2)

(2)

wherein R and n are as defined above; and X is halogen atom, and (ii) a Grignard reagent prepared by reacting magnesium with a hydroxyl-protected halogenated phenol represented by the formula (3)

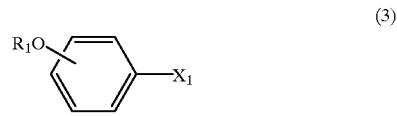

(3)

wherein $R_1$ is hydroxyl-protecting group, and represents alkyl group, alkoxyalkyl group, silyl group, acyl group, alkylthioalkyl group or alkylsulfoxy group; protected hydroxyl group is in the p-position or m-position; and $X_1$ is halogen atom, thereby producing a polysilane represented by the formula (4)

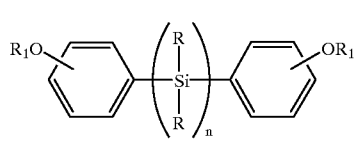

(4)

wherein R, $R_1$, the position of protected hydroxyl group and n are as defined above although variant depending on the starting materials; and (b) reacting the polysilane of the formula (4) with an acid.

5. The process for preparing a polysilane having phenol groups at both ends as defined in item 4, the process being characterized in that the polysilane having halogen atoms at both ends which is represented by the formula (2)

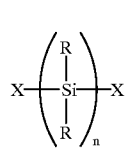

(2)

wherein R is hydrogen atom, alkyl group, aryl group, alkoxy group, amino group or silyl group; R's may be the same or at least two of them may be different from each other; n is 2 to 10,000; and X is halogen atom, is produced by subjecting to an electrode reaction a dihalosilane represented by the formula (5)

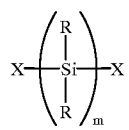

(5)

wherein m is 1 to 3; R is hydrogen atom, alkyl group, aryl group, alkoxy group, amino group or silyl group; 2 R's in the case of m=1, 4 R's in the case of m=2, or 6 R's in the case of m=3 may be the same or at least two of them may be different from each other; and X is halogen atom, using Mg or a Mg-based alloy as the anode, a lithium salt as a supporting electrolyte and an aprotic solvent as a solvent with or without use of a halogenated metal as a current carrying aid.

6. The process for preparing a polysilane having phenol groups at both ends as defined in item 4, the process being characterized in that the polysilane having halogen atoms at both ends which is represented by the formula (2)

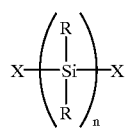

(2)

wherein R is hydrogen atom, alkyl group, aryl group, alkoxy group, amino group or silyl group; R's may be the same or at least two of them may be different from each other; n is 2 to 10,000; and X is halogen atom, is produced by reducing a dihalosilane represented by the formula (5)

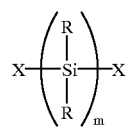

(5)

wherein m is 1 to 3; R is hydrogen atom, alkyl group, aryl group, alkoxy group, amino group or silyl group; 2 R's in the case of m=1, 4 R's in the case of m=2, or 6 R's in the case of m=3 may be the same or at least two of them may be different from each other; and X is halogen atom, using Mg or Mg-based alloy in an aprotic solvent in the presence of a lithium salt and a halogenated metal.

7. A polysilane represented by the formula (6)

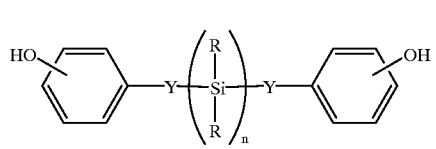

(6)

wherein R is hydrogen atom, alkyl group, aryl group, alkoxy group, amino group or silyl group; R's may be the same or at least two of them may be different from each other; Y is $CH_2$, $C_2H_4$, $C_3H_6$, $C_4H_8$, O or S; each hydroxyl group is in the p-position or m-position; and n is 2 to 10,000.

8. The polysilane as defined in item 7, wherein n is 5 to 8,500.

9. The polysilane as defined in item 7, wherein n is 13 to 8,500.

10. A process for preparing a polysilane having phenol groups at both ends which is represented by the formula (6)

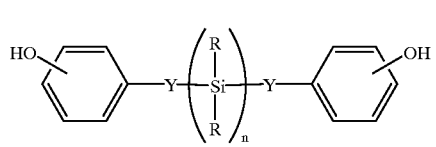

(6)

wherein R is hydrogen atom, alkyl group, aryl group, alkoxy group, amino group or silyl group; R's may be the same or at least two of them may be different from each other; Y is $CH_2$, $C_2H_4$, $C_3H_6$, $C_4H_8$, O or S; each hydroxyl group is in the p-position or m-position; and n is 2 to 10,000, the process comprising the steps of (a) conducting the Grignard reaction between (i) a polysilane having halogen atoms at both ends which is represented by the formula (2)

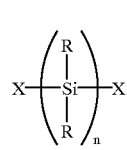

(2)

wherein R and n are as defined above; and X is halogen atom, and (ii) a Grignard reagent prepared by reacting magnesium with a hydroxyl-protected halogenated phenol derivative represented by the formula (7)

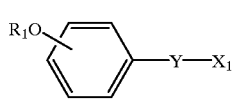
(7)

wherein $R_1$ is hydroxyl-protecting group, and represents alkyl group, alkoxyalkyl group, silyl group, acyl group, alkylthioalkyl group or alkylsulfoxy group; Y is $CH_2$, $C_2H_4$, $C_3H_6$, $C_4H_8$, O or S; protected hydroxyl group is in the p-position or m-position; and $X_1$ is halogen atom, thereby producing a polysilane represented by the formula (8)

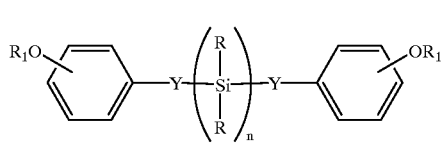
(8)

wherein R, $R_1$, Y, the position of protected hydroxyl group and n are as defined above although variant depending on the starting materials; and (b) reacting the obtained polysilane with an acid.

11. The process for preparing a polysilane having phenol groups at both ends as defined in item 10, the process being characterized in that the polysilane having halogen atoms at both ends which is represented by the formula (2)

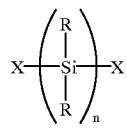
(2)

wherein R is hydrogen atom, alkyl group, aryl group, alkoxy group, amino group or silyl group; R's may be the same or at least two of them may be different from each other; n is 2 to 10,000; and X is halogen atom, is produced by subjecting to an electrode reaction a dihalosilane represented by the formula (5)

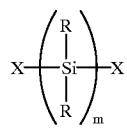
(5)

wherein m is 1 to 3; R is hydrogen atom, alkyl group, aryl group, alkoxy group, amino group or silyl group; 2 R's in the case of m=1, 4 R's in the case of m=2, or 6 R's in the case of m=3 may be the same or at least two of them may be different from each other; and X is halogen atom, using Mg or a Mg-based alloy as the anode, a lithium salt as a supporting electrolyte and an aprotic solvent as a solvent with or without use of a halogenated metal as a current carrying aid.

12. The process for preparing a polysilane having phenol groups at both ends as defined in item 10, the process being characterized in that the polysilane having halogen atoms at both ends which is represented by the formula (2)

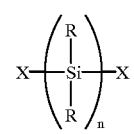
(2)

wherein R is hydrogen atom, alkyl group, aryl group, alkoxy group, amino group or silyl group; R's may be the same or at least two of them may be different from each other; n is 2 to 10,000; and X is halogen atom, is produced by reducing a dihalosilane represented by the formula (5)

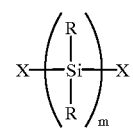
(5)

wherein m is 1 to 3; R is hydrogen atom, alkyl group, aryl group, alkoxy group, amino group or silyl group; 2 R's in the case of m=1, 4 R's in the case of m=2, or 6 R's in the case of m=3 may be the same or at least two of them may be different from each other; and X is halogen atom, using Mg or Mg-based alloy in an aprotic solvent in the presence of a lithium salt and a halogenated metal.

Hereinafter "the invention recited in claim 1 of independent form and the inventions recited in claims dependent thereon" are called "first invention in the present application", and all the inventions are collectively called merely "the present invention".

1. First Invention in the Present Application

The polysilane of the first invention in the present application is a novel compound represented by the formula (1)

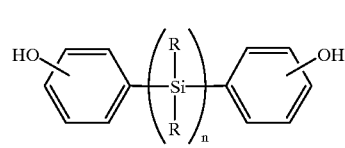
(1)

wherein R is hydrogen atom, alkyl group, aryl group, alkoxy group, amino group or silyl group, R's may be the same or at least two of them may be different from each other; each hydroxyl group is in the p-position or m-position; and n is 2 to 10,000.

In the polysilane represented by the formula (1), R represents hydrogen atom, alkyl group, aryl group, alkoxy group, amino group or silyl group. The alkyl groups in the formula (1) include those having 1 to 10 carbon atoms among which those having 1 to 6 carbon atoms are more preferred. The aryl groups in the formula (1) include phenyl group, anisyl group, phenyl group having at least one of alkyl groups of 1 to 10 carbon atoms as a substituent, p-alkoxyphenyl group, and naphthyl group. The alkoxy groups in the formula (1) include those having 1 to 10 carbon atoms among which those having 1 to 6 carbon atoms are more preferred. The silyl groups in the formula (1) include those having 1 to 10 silicon atoms among which those having 1 to 6 silicon atoms are more preferred. When R is amino group, organic substituent or silyl group, at least one of hydrogen atoms may be substituted with other groups such as alkyl, aryl or alkoxy group. Such functional groups include those described above. R's may be the same or at least two of them may be different from each other. The hydroxyl group is in the p-position or m-position on the benzene ring of phenol groups at both ends. The hydroxyl groups at two ends may be both in the p-position or both in the m-position, or one of them may be in the p-position and the other in the m-position. Optionally at least one of hydrogen atoms on the benzene ring may be substituted with other groups such as alkyl or aryl group. The alkyl and aryl groups for this purpose include those described above. The symbol n means 2 to 10,000, preferably 5 to 8,500, more preferably 13 to 8,500.

2. Second Invention in the Present Application

The second invention is directed to a process for preparing the polysilane of the first invention in the present application. In the second invention, the Grignard reaction is carried out using, as the starting materials, (i) a polysilane having halogen atoms at both ends which is represented by the formula (2)

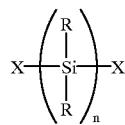
(2)

wherein R is hydrogen atom, alkyl group, aryl group, alkoxy group, amino group or silyl group; R's may be the same or at least two of them may be different from each other; n is 2 to 10,000; and X is halogen atom, and (ii) a Grignard reagent prepared by reacting magnesium with a hydroxyl-protected halogenated phenol represented by the formula (3)

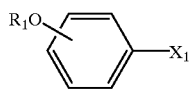
(3)

wherein $R_1$ is hydroxyl-protecting group, and represents alkyl group, alkoxyalkyl group, silyl group, acyl group, alkylthioalkyl group or alkylsulfoxy group; protected hydroxyl group is in the p-position or m-position; and $X_1$ is halogen atom.

In the formula (2), R and n are the same in detail as in the first invention, X is halogen atom (Cl, F, Br or I) and Cl is preferred.

In the formula (3), $X_1$ is halogen atom (Cl, F, Br or I) and Br or I is preferred.

The polysilane having halogen atoms at both ends which is represented by the formula (2) can be prepared by (i) an electrode reaction using a specific metal as the anode (electrode reduction synthesis method: Japanese Unexamined Patent Publication No.309953/1995), (ii) a synthesis method wherein polymerization is conducted by reduction using a specific metal in the presence of a specific lithium salt and a halogenated metal (chemical polymerization method), or (iii) a dechlorinating condensation polymerization by reduction in toluene or like solvent using an alkali metal such as sodium metal at a high temperature at which the solvent is refluxed (Kipping method: J. Am. Chem. Soc., 103 (1981) 7352).

The electrode reduction synthesis method (i) and Kipping method (iii) are known and the chemical polymerization method (ii) is novel.

The degree of polymerization of a polysilane with halogen atoms at both ends significantly affects the properties of a modified polycarbonate having a polysilane skeleton in the main chain. In other words, the electrode reduction synthesis method and chemical polymerization method are preferred because the methods can easily control the degree of polymerization in producing a polysilane with halogen atoms at both ends and can produce a polysilane with a low degree of polymerization.

When a polysilane having halogen atoms at both ends is prepared by the electrode reduction synthesis method, at least one of dihalosilanes represented by the following formula (5)

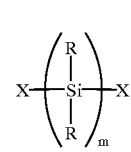
(5)

wherein m is 1 to 3; R is hydrogen atom, alkyl group, aryl group, alkoxy group, amino group or silyl group; 2 R's in the case of m=1, 4 R's in the case of m=2, or 6 R's in the case of m=3 may be the same or at least two of them may be different from each other; and X is halogen atom, is subjected to an electrode reaction using Mg or a Mg-based alloy as the anode, a lithium salt as a supporting electrolyte and an aprotic solvent as a solvent with or without use of a halogenated metal as a current carrying aid.

In the formula (5), R and X are the same in detail as above.

In the reaction, the dihalosilane is used as dissolved in a solvent. Aprotic solvents useful as the solvent include those widely used. Specific examples are ether solvents such as tetrahydrofuran, 1,2-dimethoxyethane, bis(2-methoxyethyl) ether and 1,4-dioxane, propylene carbonate, acetonitrile, dimethylformamide, dimethyl sulfoxide and methylene chloride. These solvents are usable either alone or in combination. More preferred solvents are tetrahydrofuran and 1,2-dimethoxyethane. Too low a concentration of the dihalosilane in the solvent lowers the current efficiency, whereas too high a concentration thereof may result in failure to dissolve the supporting electrolyte. Consequently the concentration of the dihalosilane in the solvent is in the range of about 0.05 to about 20 mol/l, preferably about 0.2 to about 15 mol/l, more preferably about 0.3 to about 13 mol/l.

Supporting electrolytes to be used are, for example, lithium salts such as LiCl, $LiNO_3$, $Li_2CO_3$ and $LiClO_4$. These supporting electrolytes are usable either alone or in combination. Of these supporting electrolytes, LiCl is the most preferred.

The concentration of the supporting electrolyte in the solvent is about 0.05 to about 5 mol/l, preferably about 0.1 to 3 mol/l, more preferably about 0.15 to about 2 mol/l.

To improve current conductivity, a current carrying aid may be used. Favorable current carrying aids include Al salts such as $AlCl_3$; Fe salts such as $FeCl_2$ and $FeCl_3$; Mg salts such as $MgCl_2$; Zn salts such as $ZnCl_2$; Sn salts such as $SnCl_2$; Co salts such as $CoCl_2$; Pd salts such as $PdCl_2$; V salts such as $VCl_3$; Cu salts such as $CuCl_2$; and Ca salts such as $CaCl_2$. These current carrying aids are usable either alone or in combination. Of these current carrying aids, more preferred are $AlCl_3$, $FeCl_2$, $FeCl_3$, $CoCl_2$ and $CuCl_2$. The concentration of the current carrying aid in the solvent is in the range of about 0.01 to about 6 mol/l, preferably about 0.03 to about 4 mol/l, more preferably about 0.05 to about 3 mol/l.

The anodes to be used herein are made of Mg or an alloy predominantly containing Mg. Examples of the alloy predominantly containing Mg are alloys containing about 3 to about 10% of Al. The cathodes to be used herein are unlimited insofar as they are substances through which a current can flow. Examples include stainless steel such as SUS 304 and SUS 316; metals such as Mg, Cu, Zn, Sn, Al, Ni and Co; and carbon materials.

The amount of electricity applied is at least about 1 F/mol based on the halogen in the dihalosilane. The molecular weight of the reaction product can be controlled by adjusting the amount of electricity applied.

On the other hand, the chemical polymerization method is conducted as follows. Mg or Mg-based alloy is acted on at least one of dihalosilanes represented by the formula (5) in an aprotic solvent in the presence of a specific lithium salt and a halogenated metal, giving a polysilane. The dihalosilane is reduced with Mg or Mg-based alloy to polymerize, forming a polysilane. The Mg or Mg-based alloy is consumed to become a halogenated Mg.

Examples of useful aprotic solvents are polar solvents such as tetrahydrofuran, 1,2-dimethoxyethane, propylene carbonate, acetonitrile, dimethylformamide, dimethyl sulfoxide, bis(2-methoxyethyl)ether, 1,4-dioxane and methylene chloride; and non-polar solvents such as toluene, xylene, benzene, n-pentane, n-hexane, n-octane, n-decane and cyclohexane. These solvents can be used either alone or in combination. Preferable to use are polar solvents used alone, a mixture of at least 2 species of polar solvents, and a mixture of polar and non-polar solvents. When the mixture of polar and non-polar solvents is used, it is preferred to mix them at a former:latter ratio of approximately 1:0.01–20. Tetrahydrofuran and 1,2-dimethoxyethane are more preferred as a polar solvent to be used alone or in combination with other solvents. The concentration of the dihalosilane in the solvent is in the range of about 0.05 to about 20 mol/l, preferably about 0.2 to about 15 mol/l, more preferably about 0.3 to about 13 mol/l.

Examples of the specific lithium salt are LiCl, $LiNO_3$, $Li_2CO_3$ and $LiClO_4$. These lithium salts can be used either alone or in combination. Among them, LiCl is the most preferred.

The concentration of the lithium salt in the solvent is in the range of about 0.05 to about 5 mol/l, preferably about 0.1 to about 3 mol/l, more preferably about 0.15 to about 2 mol/l.

Examples of the specific halogenated metal are $FeCl_2$, $FeCl_3$, $FeBr_2$, $FeBr_3$, $AlCl_3$, $AlBr_3$, $ZnCl_2$, $SnCl_2$, $SnCl_4$, $CuCl_2$, $CoCl_2$, $VCl_3$, $TiCl_4$, $PdCl_2$, $SmCl_2$ and $SmI_2$. Of these halogenated metals, more preferable to use are $FeCl_2$, $ZnCl_2$ and $CuCl_2$. The concentration of the halogenated metal in the solvent is in the range of about 0.01 to about 6 mol/l, preferably about 0.02 to about 4 mol/l, more preferably about 0.03 to about 3 mol/l.

The shape of Mg or Mg-based alloy is not limited insofar as the reaction is feasible. Examples are powders, granules, ribbons, flakes (produced by cutting), masses, rods and plates. Among them, preferred are powders, granules, ribbons and flakes which have a large specific surface area. As to the amount of Mg or Mg-based alloy to be used, the amount of Mg is an at least equimolar amount relative to the dihalosilane used and the amount of Mg-based alloy is such that the Mg content in the Mg-based alloy is an at least equimolar amount relative to the dihalosilane used. When the amount of Mg or Mg content in a Mg-based alloy to be used is more than an equimolar amount relative to the dihalosilane used, the reaction time is shortened. Thus the amount thereof is preferably at least 1.5 mols, more preferably at least 2 mols, per mole of the dihalosilane used.

The chemical polymerization method can be carried out, for example, as follows. The dihalosilane of the formula (5) is placed into a sealable container, along with a lithium salt, a halogenated metal, Mg or Mg-based alloy and a solvent, preferably followed by mechanical or magnetic agitation to cause a reaction. The shape of the reactor is not limited insofar as it is hermetically closable.

The reaction time is variable depending on the amounts of a dihalosilane as the raw material, Mg or Mg-based alloy, a lithium salt and a halogenated metal all used together and depending on the stirring speed. Usually it is about 30 minutes or more. The molecular weight of the reaction product can be controlled by adjusting the reaction time. When the chemical polymerization method is conducted, a more preferred degree of polymerization is 5 to 1,000.

The reaction temperature is in the range of from −20° C. to a boiling point of the solvent used, preferably about −10 to about 50° C., more preferably about −5 to about 30° C.

The Grignard reagent is prepared by reacting Mg with the hydroxyl-protected halogenated phenol of the formula (3). Halogenated phenols to be used are known and include those commercially available such as p-bromophenol, m-bromophenol or p-chlorophenol. The hydroxyl group can be protected by conventional methods, for example, a method using, as $R_1$, alkyl groups such as methyl or ethyl (Org. Synth., Coll. Vol.4, 836 (1963)); a method using, as $R_1$, alkoxyalkyl groups such as methoxymethyl, butoxymethyl, tetrahydropyranyl or tetrahydrofuranyl (Tetrahedron Lett., 661 (1978)); a method using, as $R_1$, silyl groups such as trimethylsilyl or t-butyldimethylsilyl (Tetrahedron Lett., 3527 (1970)); a method using, as $R_1$, acyl groups such as acetyl (Tetrahedron Lett., 2431 (1979)); a method using, as $R_1$, alkylthioalkyl groups such as methylthiomethyl (Tetrahedron Lett., 533 (1977)); and a method using, as $R_1$, alklylsulfoxy groups such as methanesulfoxy or p-toluenesulfoxy (J. Org., Chem., 32,1058 (1967)).

The Grignard reagent can be prepared by conventional methods. The required amount of Mg is 1 mol or more per mol of the hydroxyl-protected halogenated phenol, usually in the range of 1 to 2 mols.

Useful solvents include those conventionally used in the Grignard reaction such as diethyl ether or tetrahydrofuran. The concentration of the hydroxyl-protected halogenated phenol in the solvent is in the range of about 0.1 to about 20 mol/l, preferably about 0.2 to about 8 mol/l, more preferably about 0.3 to about 5 mol/l.

In conducting the Grignard reaction, the polysilane having halogen atoms in both ends which is represented by the formula (2) is concentrated by distilling off the solvent and is added to the Grignard reagent solution.

The Grignard reaction is usually carried out by stirring at room temperature, or by heating or cooling at a temperature at which the reaction proceeds. The stirring time is usually about 0.1 to about 36 hours.

If a solvent useful in the Grignard reaction such as tetrahydrofuran is used in preparing the polysilane halogenated at both ends, advantageously the reaction mixture can be added to the Grignard reagent solution without distilling off the solvent.

After completion of the reaction, water is added to inactivate the excess Grignard reagent. Then, the mixture is extracted to give a polysilane having phenol groups at both ends, the phenol groups containing hydroxyl groups protected, the polysilane being represented by the formula (4)

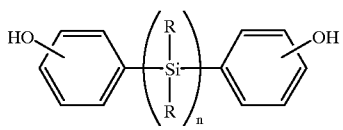
(1)

wherein R, $R_1$, the position of protected hydroxyl group and n are as defined above although variant depending on the starting materials.

The hydroxyl groups in the obtained polysilane are deprotected, thereby producing a polysilane having phenol groups at both ends which is represented by the formula (1). The hydroxyl groups are deprotected by methods selected according to the type of protecting group. The deprotection may be effected by treating the protected hydroxyl group with hydrochloric acid, sulfuric acid, nitric acid, phosphoric acid, perchloric acid, or organic acids such as p-toluenesulfonic acid, trichloroacetic acid, trifluoroacetic acid or nitrophenol, followed by stirring for about 0.1 to about 48 hours.

The above-obtained polysilane having phenol groups at both ends which is represented by the formula (1) may contain impurities such as phenols evolved due to the excess Grignard reagent. The impurities, however, can be easily removed by washing the polysilane with methanol, ethanol, water or a mixture thereof.

3. Third Invention in the Present Application

The polysilane of the third invention in the present application is a novel polysilane represented by the formula (6)

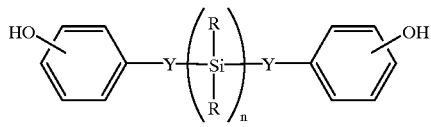
(6)

wherein R is hydrogen atom, alkyl group, aryl group, alkoxy group, amino group or silyl group; R's may be the same or at least two of them may be different from each other; Y is $CH_2$, $C_2H_4$, $C_3H_6$, $C_4H_8$, O or S; each hydroxyl group is in the p-position or m-position; and n is 2 to 10,000.

In the polysilane of the formula (6), R represents hydrogen atom, alkyl group, aryl group, alkoxy group, amino group or silyl group. Useful alkyl groups include those having 1 to 10 carbon atoms. Among them, those having 1 to 6 carbon atoms are more preferred. The aryl groups in the formula (6) include phenyl group, anisyl group, phenyl group having at least one of alkyl groups of 1 to 10 carbon atoms as a substituent, p-alkoxyphenyl group and naphthyl group. The alkoxy groups in the formula (6) include those having 1 to 10 carbon atoms. Of these groups, those having 1 to 6 carbon atoms are more preferred. The silyl groups in the formula (6) include those having 1 to 10 silicon atoms among which those having 1 to 6 silicon atoms are more preferred. When R is amino group, organic substituent or silyl group, at least one of hydrogen atoms may be substituted with other groups such as alkyl, aryl or alkoxy group. Such functional groups include those described above. R's may be the same or at least two of them may be different from each other. Y is $CH_2$, $C_2H_4$, $C_3H_6$, $C_4H_8$, O or S. Each hydroxyl group is in the p-position or m-position on the benzene ring of phenol groups at both ends. The hydroxyl groups at two ends may be both in the p-position or both in the m-position, or one of them may be in the p-position and the other in the m-position. Optionally at least one of hydrogen atoms on the benzene ring may be substituted with other groups such as alkyl or aryl group. The alkyl and aryl groups for this purpose include those described above. The symbol n means 2 to 10,000, preferably 5 to 8,500, more preferably 13 to 8,500.

4. Fourth Invention in the Present Application

The fourth invention in the present application is essentially the same as the second invention except that a hydroxyl-protected halogenated phenol derivative represented by the following formula (7) is used in lieu of the hydroxyl-protected halogenated phenol

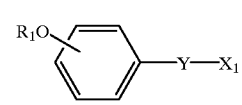
(7)

wherein $R_1$ is hydroxyl-protecting group, and represents alkyl group, alkoxyalkyl group, silyl group, acyl group, alkylthioalkyl group or alkylsulfoxy group; Y is $CH_2$, $C_2H_4$, $C_3H_6$, $C_4H_8$, O or S; protected hydroxyl group is in the p-position or m-position; and $X_1$ is halogen atom.

In the hydroxyl-protected halogenated phenol derivative represented by the formula (7), Y is $CH_2$, $C_2H_4$, $C_3H_6$, $C_4H_8$, O or S.

The halogenated phenol derivatives to be used are known. For example, p-(β-bromoethyl)phenol can be easily produced by reacting hydrobromic acid with p-(β-hydroxyethyl)phenol commercially available. Other halogenated phenol derivatives include, for example, m-(β-bromoethyl)phenol and p-(γ-bromopropyl)phenol.

The hydroxyl group can be deprotected by conventional methods, e.g. in the same manner as described in the second invention.

Also in the fourth invention, the degree of polymerization of the polysilane halogenated at both ends which is represented by the formula (2) greatly affects the properties of modified polycarbonates having a polysilane skeleton in the main chain. For this reason, the electrode reduction synthesis method and chemical polymerization method are preferably utilizable in producing a polysilane with halogen atoms at both ends because the methods easily control the degree of polymerization and can produce a polysilane with a low degree of polymerization.

In the same manner as in the second invention, the hydroxyl groups can be deprotected in the polysilane of the following formula (8) prepared by the Grignard reaction (8)

$R_1O$-⟨⟩-Y-(Si(R)-)$_n$-Y-⟨⟩-$OR_1$ wherein R, $R_1$, Y, the position of protected hydroxyl group and n are as defined above although variant with the starting materials, giving a polysilane of the formula (6).

According to the present invention, the following remarkable results are achieved.

(a) When using a polysilane having phenol groups at both ends according to the present invention, a polycarbonate or polyester having a polysilane skeleton in the main chain can be produced with improved hardness, and a more useful hard coat material can be provided.

(b) The polycarbonate or the like with a polysilane skeleton prepared from the polysilane having phenol groups at both ends according to the present invention has a photosensitive property and a charge-transporting property derived from the polysilane, and can be used to provide a new type of hard coat material having an optoelectronic function.

(c) When the electrode reduction synthesis method or chemical polymerization method is conducted, the degree of polymerization of a polysilane with phenol groups at both ends can be controlled, making it possible to give a modified polycarbonate or the like having properties optimal for various applications as a hard coat material.

BRIEF DESCRIPTION OF THE DRAWINGS

FIG. 15 is a UV chart of the polysilane prepared in Example 44.

BEST MODE OF CARRYING OUT THE INVENTION

Figure 1:
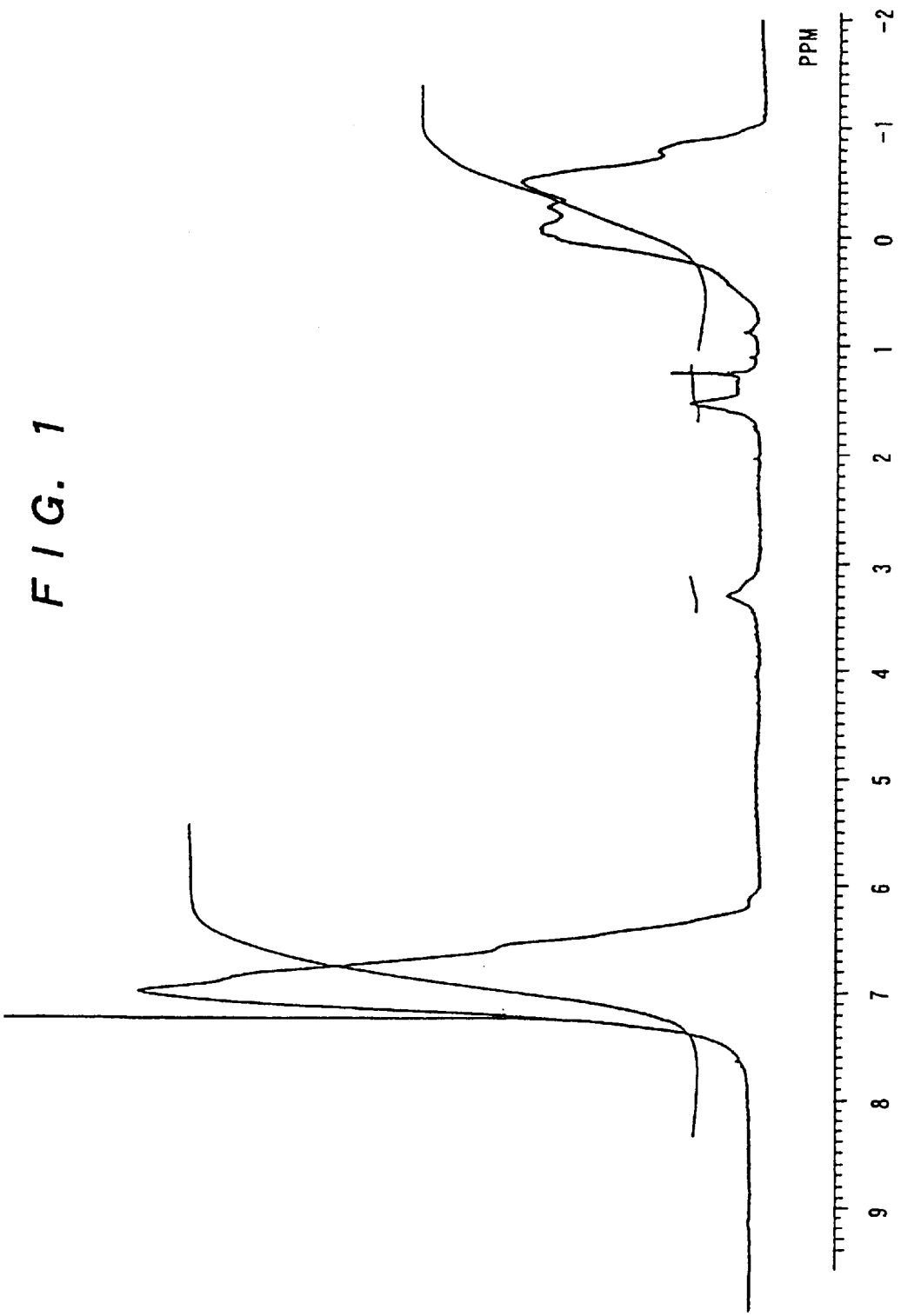
FIG. 1 is a $^1$H-NMR chart of the polysilane prepared in Example 27.

The following examples are given to clarify the features of the present invention.

Examples 1–9 given below are illustrative of the synthesis of polysilanes with halogen atoms at both ends by the electrode reduction synthesis method.

EXAMPLE 1

Seventeen grams of anhydrous lithium chloride (LiCl) and 10 g of anhydrous ferrous chloride (FeCl$_2$) were placed into a 800 ml-vol. electrolysis vessel equipped with an anode made of Mg (electrode area 63 cm$^2$) and a cathode made of stainless steel (SUS 304) (electrode area 63 cm$^2$). The air in the electrolysis vessel was replaced by deoxidized dry argon. Added were 650 ml of tetrahydrofuran (THF) predried over sodium-benzophenone ketyl and 64 g (0.33 mol) of methylphenyldichlorosilane purified by distillation. While the reaction solution was stirred and maintained at 20° C., an electric current was applied from a constant current power source. The current was applied to pass 3.5 F/mol of electricity based on methylphenyldichlorosilane.

After completion of current application, the molecular weight of the reaction product was measured. The product was found to have a weight average molecular weight of 19,000 (average degree of polymerization about 158). A mass spectrometric analysis confirmed that the reaction product was chlorinated at both ends.

EXAMPLE 2

The procedure of Example 1 was repeated except that the passed electricity was 2.5 F/mol. The reaction product was found to have a weight average molecular weight of 10,800 (average degree of polymerization about 90).

EXAMPLE 3

The procedure of Example 1 was repeated except that the passed electricity was 2.0 F/mol. The reaction product was found to have a weight average molecular weight of 5,800 (average degree of polymerization about 48).

EXAMPLE 4

The procedure of Example 1 was repeated except that the passed electricity was 1.5 F/mol. The reaction product was found to have a weight average molecular weight of 1,100 (average degree of polymerization about 9).

EXAMPLE 5

The procedure of Example 1 was repeated except that 73 g (0.33 mol) of p-ethylphenylmethyldichlorosilane was used as the raw material. The reaction product was found to have a weight average molecular weight of 23,000 (average degree of polymerization about 155).

EXAMPLE 6

The procedure of Example 1 was repeated except that 82 g (0.33 mol) of p-butylphenylmethyldichlorosilane was used as the raw material. The reaction product was found to have a weight average molecular weight of 21,500 (average degree of polymerization about 122).

EXAMPLE 7

The procedure of Example 1 was repeated except that 65 g (0.33 mol) of cyclohexylmethyldichlorosilane was used as the raw material. The reaction product was found to have a weight average molecular weight of 13,300 (average degree of polymerization about 106).

EXAMPLE 8

The procedure of Example 1 was repeated except that 32 g (0.16 mol) of methylphenyldichlorosilane and 21 g (0.16 mol) of dimethyldichlorosilane were used as the raw materials. The reaction product had a weight average molecular weight of 16,100.

EXAMPLE 9

The procedure of Example 1 was repeated except that 57 g (0.30 mol) of methylphenyldichlorosilane and 4 g (0.03 mol) of dimethyldichlorosilane were used as the raw materials. The reaction product had a weight average molecular weight of 14,700.

Examples 10 to 26 described below illustrate the synthesis of polysilanes halogenated at both ends by the chemical polymerization method.

EXAMPLE 10

Into a 1-liter vol. eggplant type flask equipped with a three way stop-cock were placed 60 g of granular magnesium (about 1 mm in particle size), 16 g of anhydrous lithium chloride (LiCl) and 9.6 g of anhydrous ferrous chloride ($FeCl_2$). The mixture was dried with heating to 50° C. under a reduced pressure of 1 mmHg. Dry argon gas was introduced into the reactor. Added were 600 ml of tetrahydrofuran (THF) predried over sodium-benzophenone ketyl, followed by 30 minutes of stirring at room temperature. Sixty-four grams (0.33 mol) of methylphenyldichlorosilane purified by distillation was added with a syringe. The mixture was stirred at room temperature for about 12 hours.

After completion of the reaction, the molecular weight of the reaction product was measured. It was found that the reaction product had a weight average molecular weight of 18,300 (average degree of polymerization about 153). A mass spectrometric analysis confirmed that the reaction product was chlorinated at both ends.

EXAMPLE 11

The procedure of Example 10 was repeated except that the mixture was stirred for 10 hours after addition of methylphenyldichlorosilane. The reaction product had a weight average molecular weight of 11,900 (average degree of polymerization about 99).

EXAMPLE 12

The procedure of Example 10 was conducted except that the mixture was stirred for 7 hours after addition of methylphenyldichlorosilane. The reaction product had a weight average molecular weight of 5,500 (average degree of polymerization about 46).

EXAMPLE 13

The procedure of Example 10 was conducted except that the mixture was stirred for 2 hours after addition of methylphenyldichlorosilane. The reaction product had a weight average molecular weight of 1,300 (average degree of polymerization about 11).

EXAMPLE 14

The procedure of Example 10 was conducted except that a mixture of 450 ml of THF and 150 ml of toluene was used as a solvent. The reaction product had a weight average molecular weight of 17,900 (average degree of polymerization about 149).

EXAMPLE 15

The procedure of Example 10 was repeated except that 73 g (0.33 mol) of p-ethylphenylmethyldichlorosilane was used as the raw material. The reaction product had a weight average molecular weight of 22,200 (average degree of polymerization about 150).

EXAMPLE 16

The procedure of Example 10 was repeated except that 82 g (0.33 mol) of p-butylphenylmethyldichlorosilane was used as the raw material. The reaction product had a weight average molecular weight of 17,200 (average degree of polymerization about 98).

EXAMPLE 17

The procedure of Example 10 was repeated except that 65 g (0.33 mol) of cyclohexylmethyldichlorosilane was used as the raw material. The reaction product had a weight average molecular weight of 13,900 (average degree of polymerization about 111).

EXAMPLE 18

The procedure of Example 10 was repeated except that 32 g (0.16 mol) of methylphenyldichlorosilane and 21 g (0.16 mol) of dimethyldichlorosilane were used as the raw materials. The reaction product had a weight average molecular weight of 14,700.

EXAMPLE 19

Into a 100 ml-vol. eggplant type flask equipped with a three way stop-cock were placed 50 g of granular magnesium, 13.3 g of anhydrous lithium chloride (LiCl) and 8.6 g of anhydrous zinc chloride ($ZnCl_2$). The mixture was dried with heating to 50° C. under a reduced pressure of 1 mmHg. Dry argon gas was introduced into the reactor. Added were 220 ml of tetrahydrofuran (THF) predried over sodium-benzophenone ketyl, followed by about 30 minutes of stirring at room temperature. Sixty-four grams (0.33 mol) of methylphenyldichlorosilane purified by distillation was added with a syringe. The mixture was stirred at room temperature for about 15 hours. The stirring was effected by placing into the reactor, magnet chips 7 mm in diameter and 30 mm in length and stirring the mixture with a magnetic stirrer (number of revolutions 1,350 rpm).

After completion of stirring, the molecular weight of the reaction product was measured. It was found that the reaction product had a weight average molecular weight of 16,600 (average degree of polymerization about 138). A mass spectrometric analysis confirmed that the reaction product was chlorinated at both ends.

EXAMPLE 20

The procedure of Example 19 was repeated with the exception of using 8.5 g of anhydrous copper chloride ($CuCl_2$) in place of anhydrous zinc chloride ($ZnCl_{12}$) and stirring the mixture for 72 hours after addition of methylphenyldichlorosilane. The reaction product had a weight average molecular weight of 18,900 (average degree of polymerization about 158).

EXAMPLE 21

The procedure of Example 19 was conducted except that the mixture was stirred for 5 hours after addition of methylphenyldichlorosilane. The reaction product had a weight average molecular weight of 6,300 (average degree of polymerization about 53).

EXAMPLE 22

The procedure of Example 19 was repeated with the exception of revolving a magnetic stirrer at 720 rpm. The reaction product had a weight average molecular weight of 8,300 (average degree of polymerization about 69).

EXAMPLE 23

The procedure of Example 19 was repeated except that 73 g (0.33 mol) of p-ethylphenylmethyldichlorosilane was used as the raw material and that the mixture was stirred for 48 hours after addition of the raw material. The reaction product had a weight average molecular weight of 13,900 (average degree of polymerization about 94).

EXAMPLE 24

The procedure of Example 19 was repeated except that a mixture of 33 g (0.17 mol) of n-hexylmethyl-dichlorosilane and 32 g (0.17 mol) of methylphenyldichlorosilane was used as the raw material. The reaction product had a weight average molecular weight of 2,070 (average degree of polymerization about 170).

EXAMPLE 25

The procedure of Example 19 was repeated except that a mixture of 6.5 g (0.033 mol) of cyclohexylmethyldichlorosilane and 57.5 g (0.30 mol) of methylphenyldichlorosilane was used as the raw material. The reaction product had a weight average molecular weight of 16,200 (average degree of polymerization about 134).

EXAMPLE 26

The procedure of Example 19 was repeated except that a mixture of 6.5 g (0.033 mol) of 1,1,3,3-tetramethyl-1,3-dichlorodisiloxane and 57.5 g (0.30 mol) of methylphenyl-dichlorosilane was used as the raw material. The reaction product had a weight average molecular weight of 9,800 (average degree of polymerization about 81).

Examples 27–46 given below illustrate the synthesis of polysilanes having phenol groups at both ends.

EXAMPLE 27

(Grignard Reaction)

A 2 liter-vol. reactor equipped with a dropping funnel, a reflux tube and a stirrer was charged with 17.8 g (0.73 mol) of flakes of Mg after which dry argon gas was introduced. Then, 300 ml of THF predried over sodium-benzophenone ketyl was added and 144 g (0.67 mol) of p-methoxymethoxybromobenzene was added dropwise to produce a Grignard reagent. Thereafter, the reaction product prepared in Example 1 (THF solution of a polysilane chlorinated at both ends) was added, followed by stirring at room temperature for about 24 hours.

After completion of the reaction, 300 ml of water was gradually added with cooling to inactivate the excess Grignard reagent. The reaction mixture was extracted with ether. The ether layer was dried over anhydrous $MgSO_4$ and concentrated, giving 60 g of an unpurified polysilane (polysilane having methoxymethyl-protected phenol groups introduced at both ends).

(Purification)

The unpurified polysilane was re-dissolved in 20 ml of THF. With stirring, a mixture of 600 ml of methanol and 150 ml of water was added dropwise. The impurities were removed by re-precipitation, whereby an impurity-free polysilane was produced in the form of a white solid. The supernatant was removed by decantation after which the residue was dried, giving 45 g of a polysilane. The polysilane was structurally analyzed by $^1$H-NMR and was found to be a polysilane having phenol groups at both ends, the phenol groups containing hydroxyl groups protected with methoxymethyl.

(Deprotection Reaction)

Added to 45 g of obtained polysilane were 175 ml of THF, 50 ml of water and 20 ml of concentrated hydrochloric acid. The mixture was stirred at 40° C. for about 24 hours. After completion of the reaction, the reaction mixture was extracted with 200 ml of ether. The ether layer was washed with 50 ml of water twice. Thereafter the ether layer was dried over anhydrous $MgSO_4$ and concentrated, giving 40 g of an unpurified polysilane (polysilane having phenol groups at both ends).

(Purification)

Figure 2:
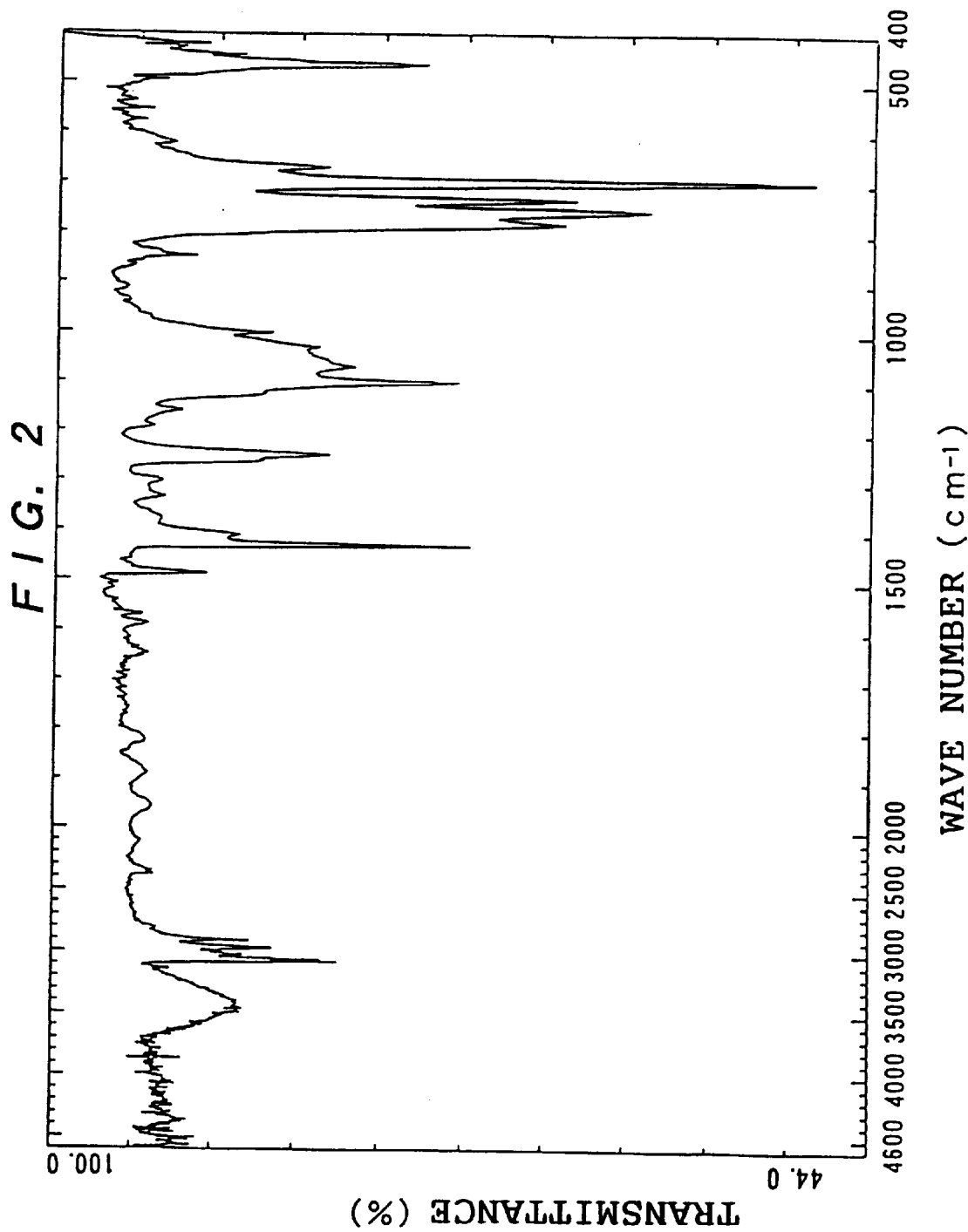
FIG. 2 is an IR chart of the polysilane prepared in Example 27.
Figure 3:
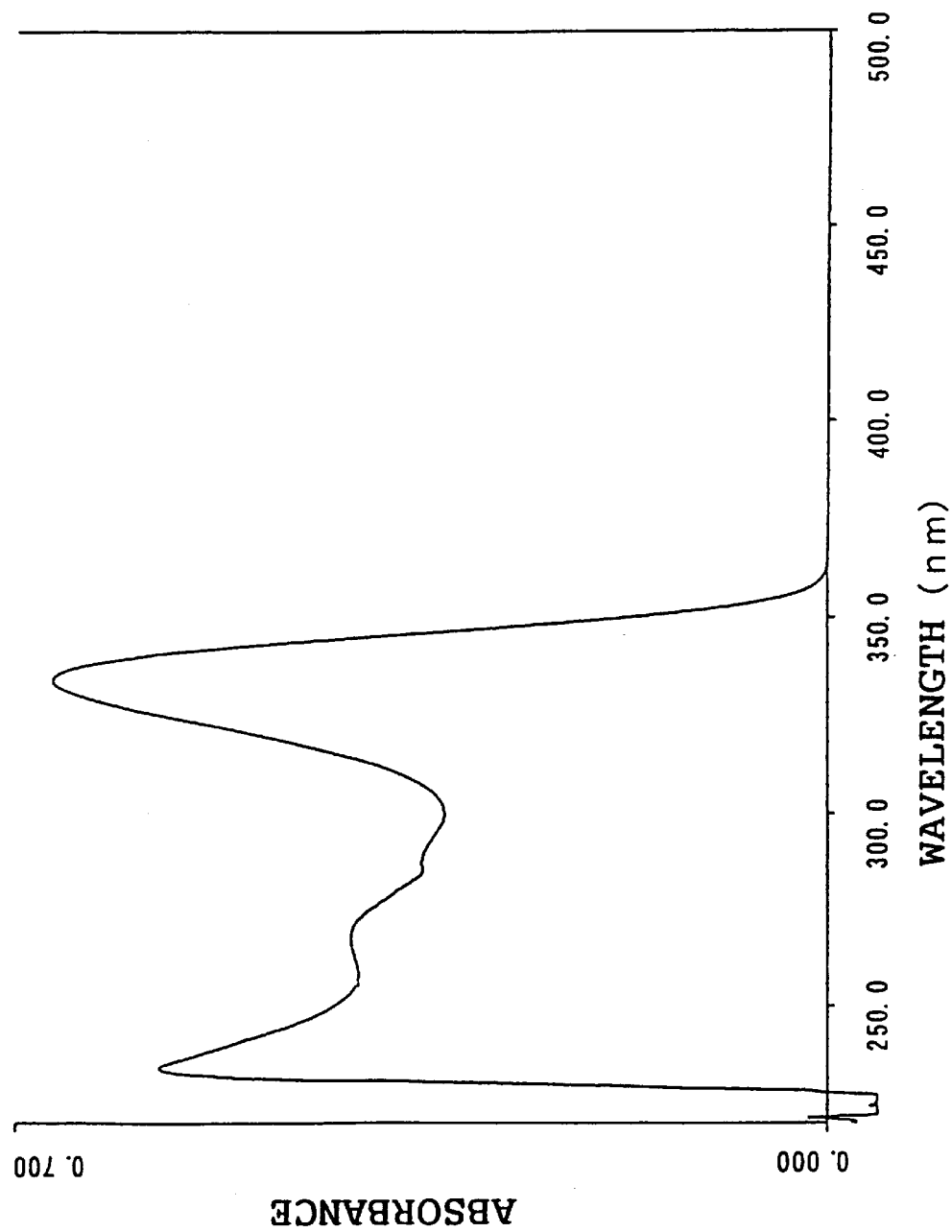
FIG. 3 is a UV chart of the polysilane prepared in Example 27.

The unpurified polysilane was re-dissolved in 150 ml of a good solvent THF. With stirring, 3 liter of a poor solvent ethanol was added dropwise. The impurities were removed by re-precipitation, whereby a polysilane was produced in the form of a white solid. The supernatant was removed by decantation after which the residue was dried, giving 18 g of a polysilane. The polysilane was structurally analyzed by $^1$H-NMR, IR and UV (see FIGS. 1, 2 and 3) and was confirmed to have phenol groups introduced at both ends. The $^1$H-NMR determination was carried out using JNM-GX 270 manufactured by JEOL and deuterated chloroform as a solvent. The IR determination was carried out by a KBr method using FTIR-7000 manufactured by JASCO. The UV determination was carried out using U-3410 manufactured by HITACHI, LTD. and THF as a solvent (the same analyses were effected in subsequent Examples).

The molecular weight of the reaction product was measured. The product had a weight average molecular weight of 19,200 (average degree of polymerization about 158).

EXAMPLE 28

Figure 4:
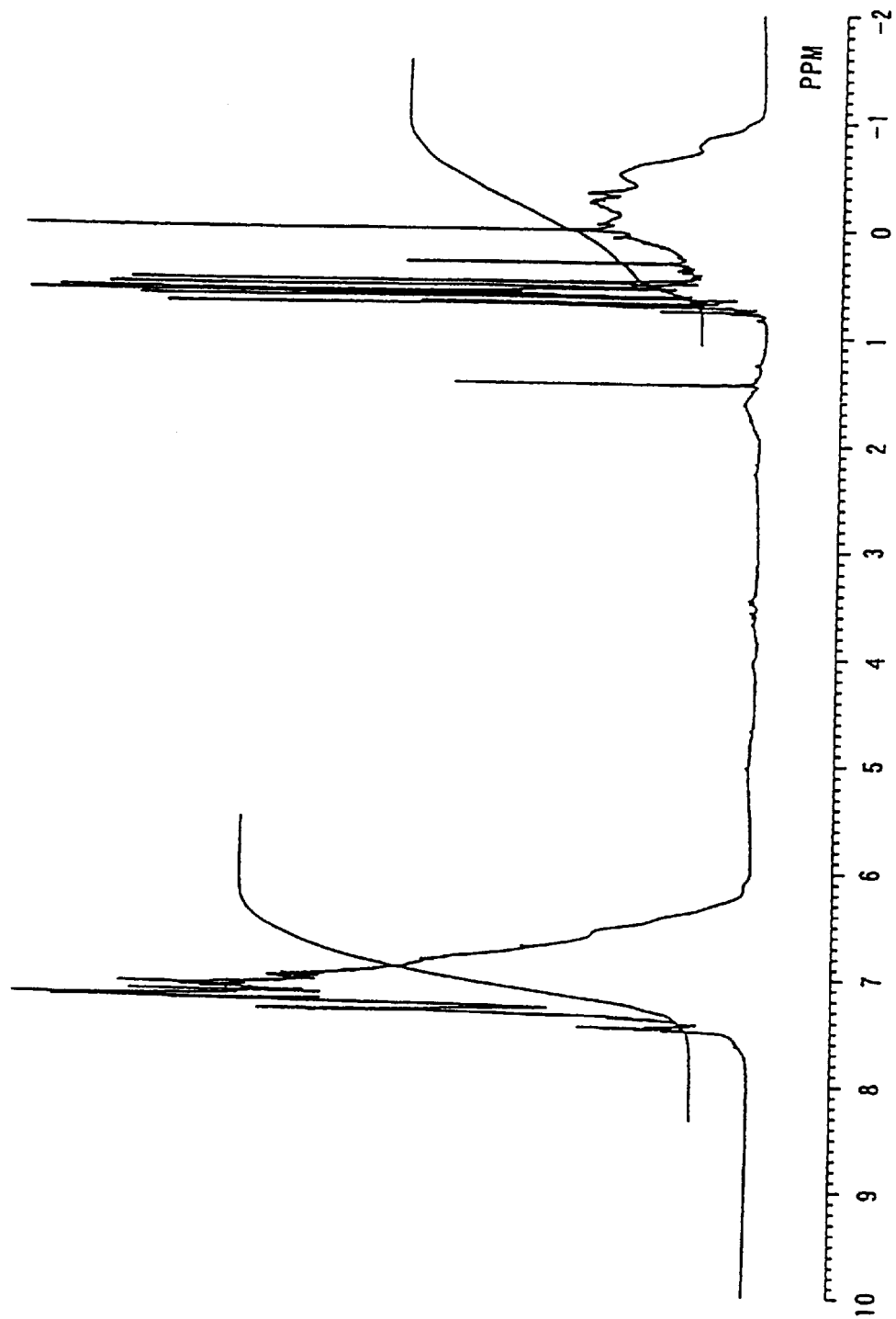
FIG. 4 is a $^1$H-NMR chart of the polysilane prepared in Example 28.
Figure 5:
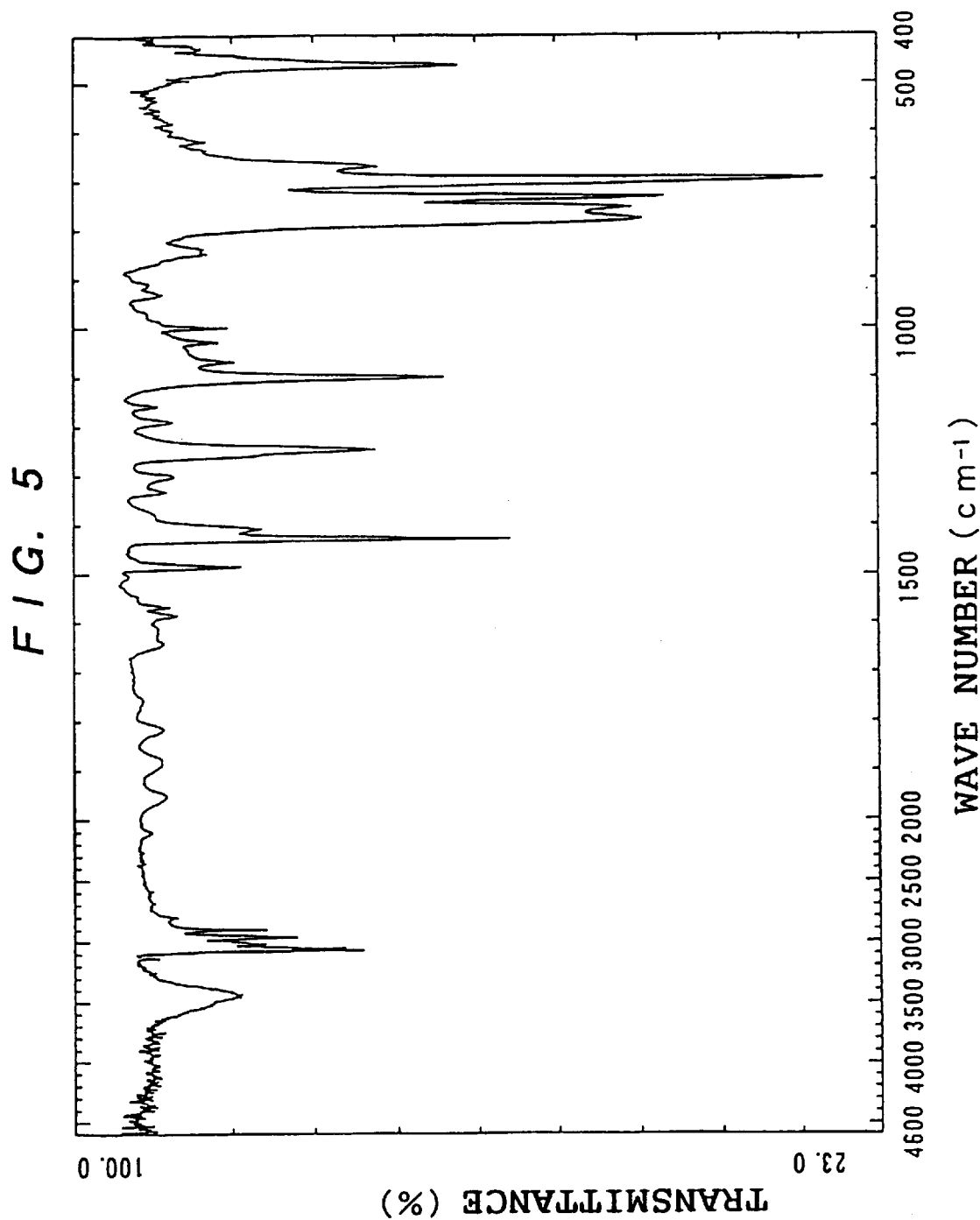
FIG. 5 is an IR chart of the polysilane prepared in Example 28.
Figure 6:
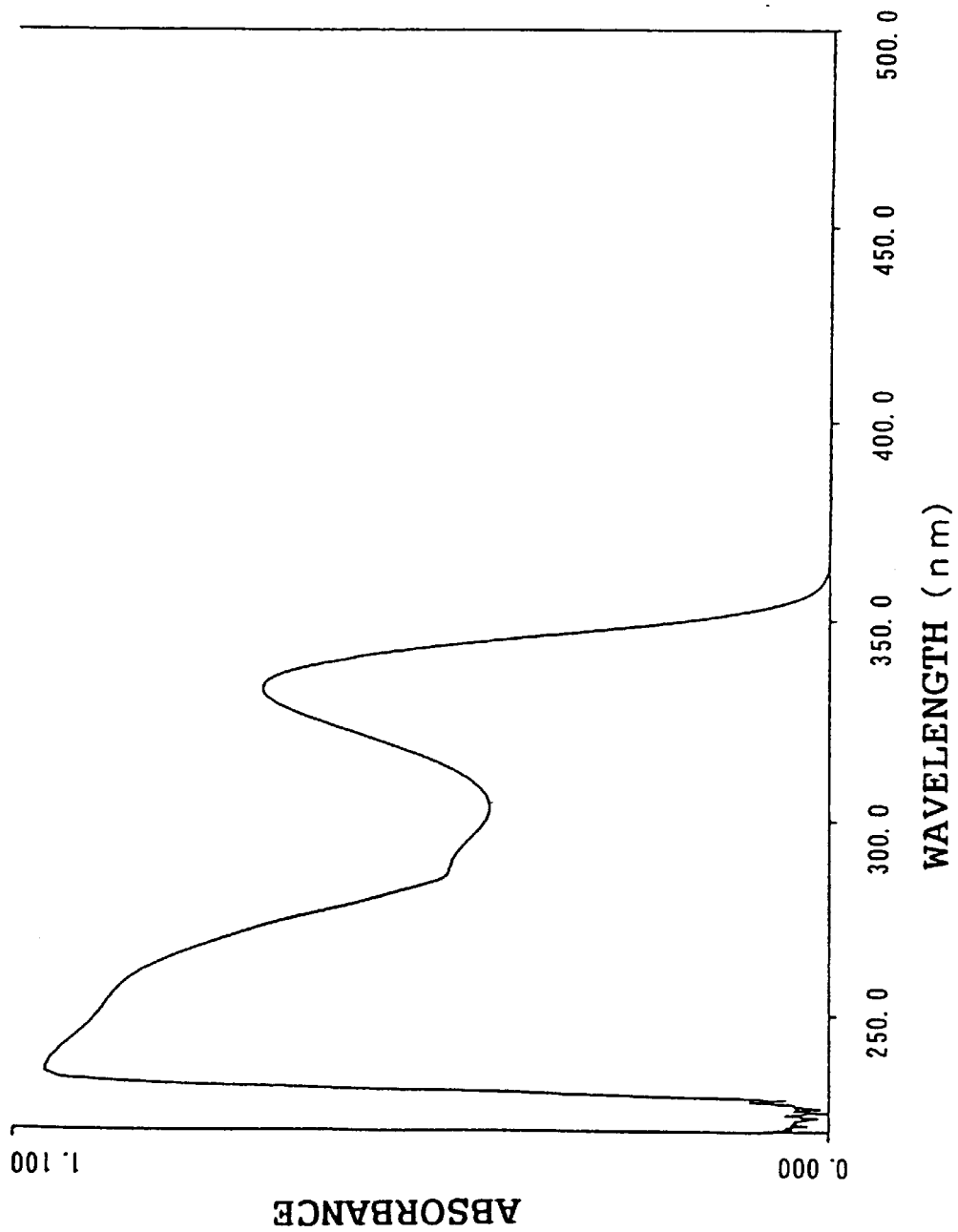
FIG. 6 is a UV chart of the polysilane prepared in Example 28.

A reaction was conducted in the same manner as in Example 27 with the exception of using the reaction product prepared in Example 3 as the polysilane chlorinated at both ends. In the purification after completion of the deprotection reaction, methanol was used in place of ethanol as the poor solvent. The procedure gave a polysilane of 6,100 in weight average molecular weight (average degree of polymerization about 49) which had phenol groups introduced at both ends. FIGS. 4, 5 and 6 show $^1$H-NMR, IR and UV charts, respectively.

EXAMPLE 29

A reaction was conducted in the same manner as in Example 27 with the exception of using the reaction product prepared in Example 4 as the polysilane chlorinated at both ends. In the purification after completion of the deprotection reaction, 25 ml of THF was used as a good solvent and a mixture of 400 ml of methanol and 100 ml of water was used as a poor solvent. The procedure gave a wax-like polysilane of 1,300 in weight average molecular weight (average degree of polymerization about 9) which had phenol groups introduced at both ends.

EXAMPLE 30

A reaction was conducted in the same manner as in Example 27 with the exception of using the reaction product prepared in Example 5 as the polysilane chlorinated at both ends. As a result, a polysilane having phenol groups introduced at both ends was prepared.

EXAMPLE 31

A reaction was conducted in the same manner as in Example 27 with the exception of using the reaction product prepared in Example 6 as the polysilane chlorinated at both ends. As a result, a polysilane having phenol groups introduced at both ends was prepared.

EXAMPLE 32

A reaction was conducted in the same manner as in Example 27 with the exception of using the reaction product prepared in Example 7 as the polysilane chlorinated at both ends. As a result, a polysilane having phenol groups introduced at both ends was prepared.

EXAMPLE 33

A reaction was conducted in the same manner as in Example 27 with the exception of using the reaction product prepared in Example 8 as the polysilane chlorinated at both ends. As a result, a polysilane having phenol groups introduced at both ends was prepared.

EXAMPLE 34

A reaction was conducted in the same manner as in Example 27 with the exception of using the reaction product prepared in Example 9 as the polysilane chlorinated at both ends. The procedure gave a polysilane of 17,800 in weight average molecular weight (average degree of polymerization about 148) which had phenol groups introduced at both ends.

EXAMPLE 35

A reaction was conducted in the same manner as in Example 27 with the exception of using 163 g (0.67 mol) of a halogenated phenol derivative wherein the hydroxyl group of p-(β-bromoethyl)phenol was protected with methoxymethyl group in place of 144 g (0.67 mol) of p-methoxymethoxybromobenzene. The procedure gave a polysilane of 18,300 in weight average molecular weight (average degree of polymerization about 150) which had the phenol derivatives introduced at both ends.

EXAMPLE 36

Figure 7:
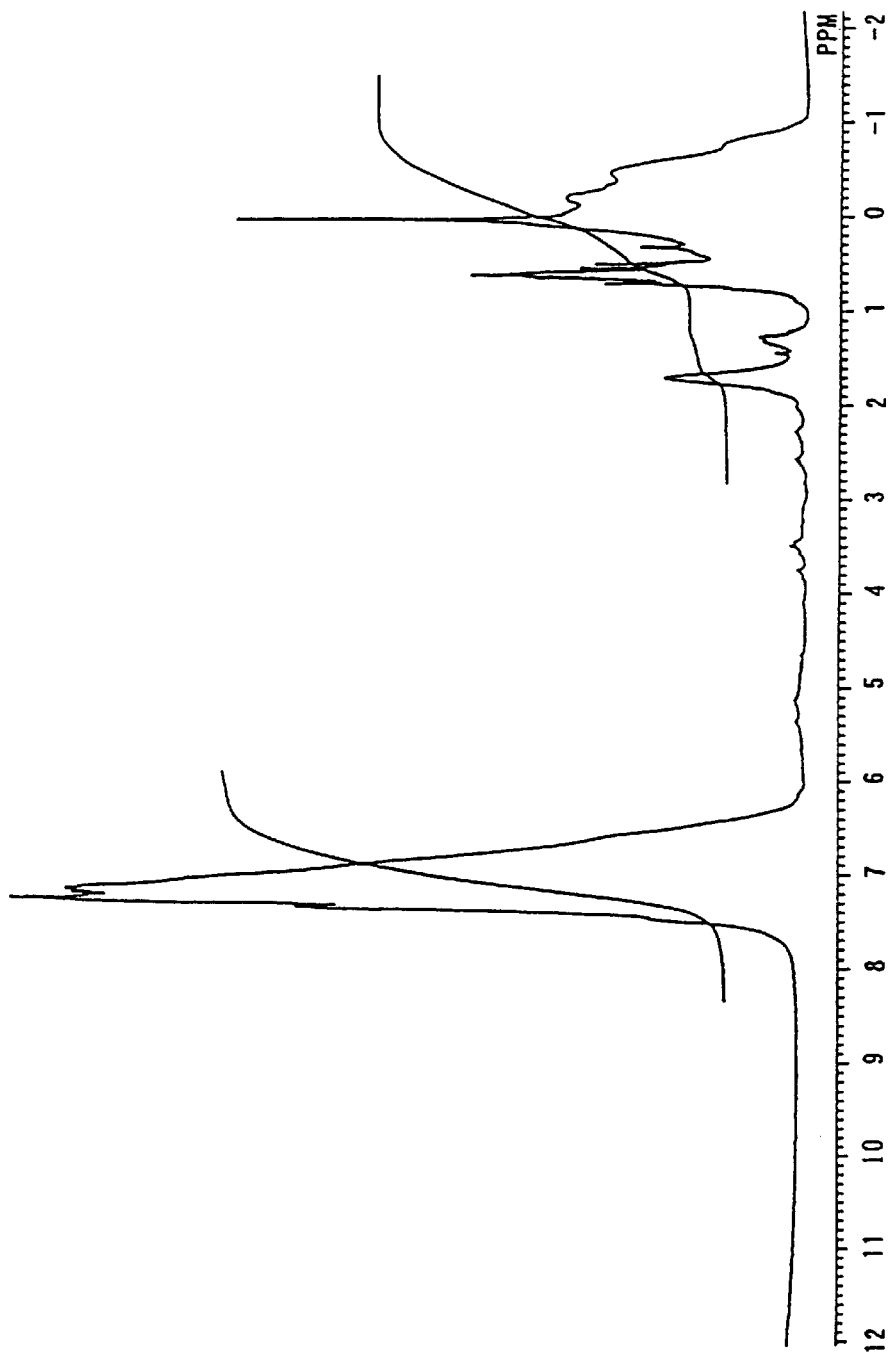
FIG. 7 is a $^1$H-NMR chart of the polysilane prepared in Example 36.
Figure 8:
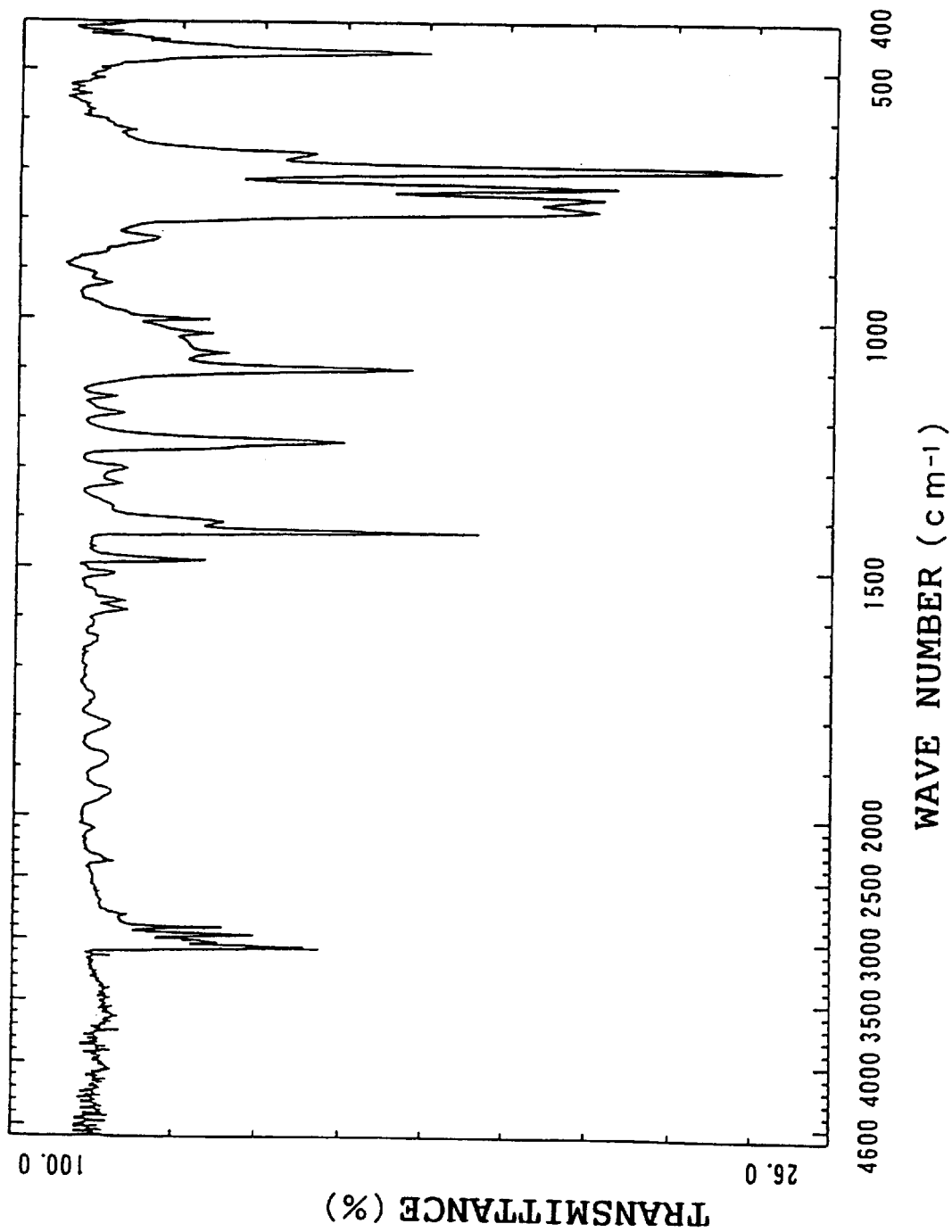
FIG. 8 is an IR chart of the polysilane prepared in Example 36.
Figure 9:
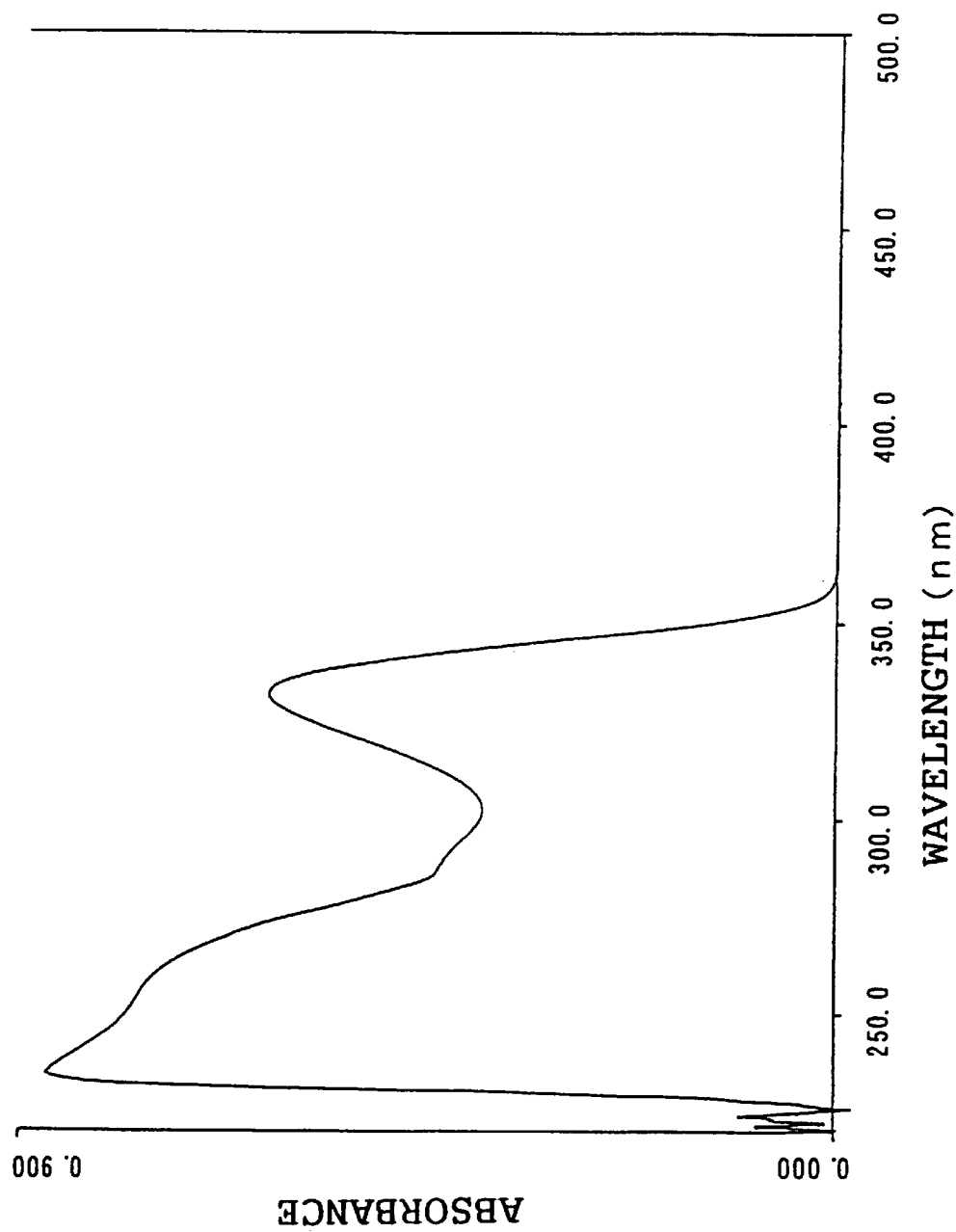
FIG. 9 is a UV chart of the polysilane prepared in Example 36.

A reaction was conducted in the same manner as in Example 27 with the exception of using the reaction product prepared in Example 3 as the polysilane chlorinated at both ends and using 163 g (0.67 mol) of a halogenated phenol derivative wherein the hydroxyl group of p-(β-bromoethyl)-phenol was protected with methoxymethyl group in place of 144 g (0.67 mol) of p-methoxymethoxybromobenzene. The procedure gave a polysilane of 6,100 in weight average molecular weight (average degree of polymerization about 49) which had the phenol derivatives introduced at both ends. FIGS. 7, 8 and 9 show $^1$H-NMR, IR and UV charts, respectively.

EXAMPLE 37

A reaction was conducted in the same manner as in Example 28 with the exception of using the reaction product prepared in Example 12 as the polysilane chlorinated at both ends. As a result, a polysilane having phenol groups introduced at both ends was prepared.

EXAMPLE 38

A reaction was conducted in the same manner as in Example 29 with the exception of using the reaction product prepared in Example 13 as the polysilane chlorinated at both ends. As a result, a polysilane having phenol groups introduced at both ends was prepared.

EXAMPLE 39

A reaction was conducted in the same manner as in Example 27 with the exception of using the reaction product prepared in Example 15 as the polysilane chlorinated at both ends. As a result, a polysilane having phenol groups introduced at both ends was prepared.

EXAMPLE 40

Figure 10:
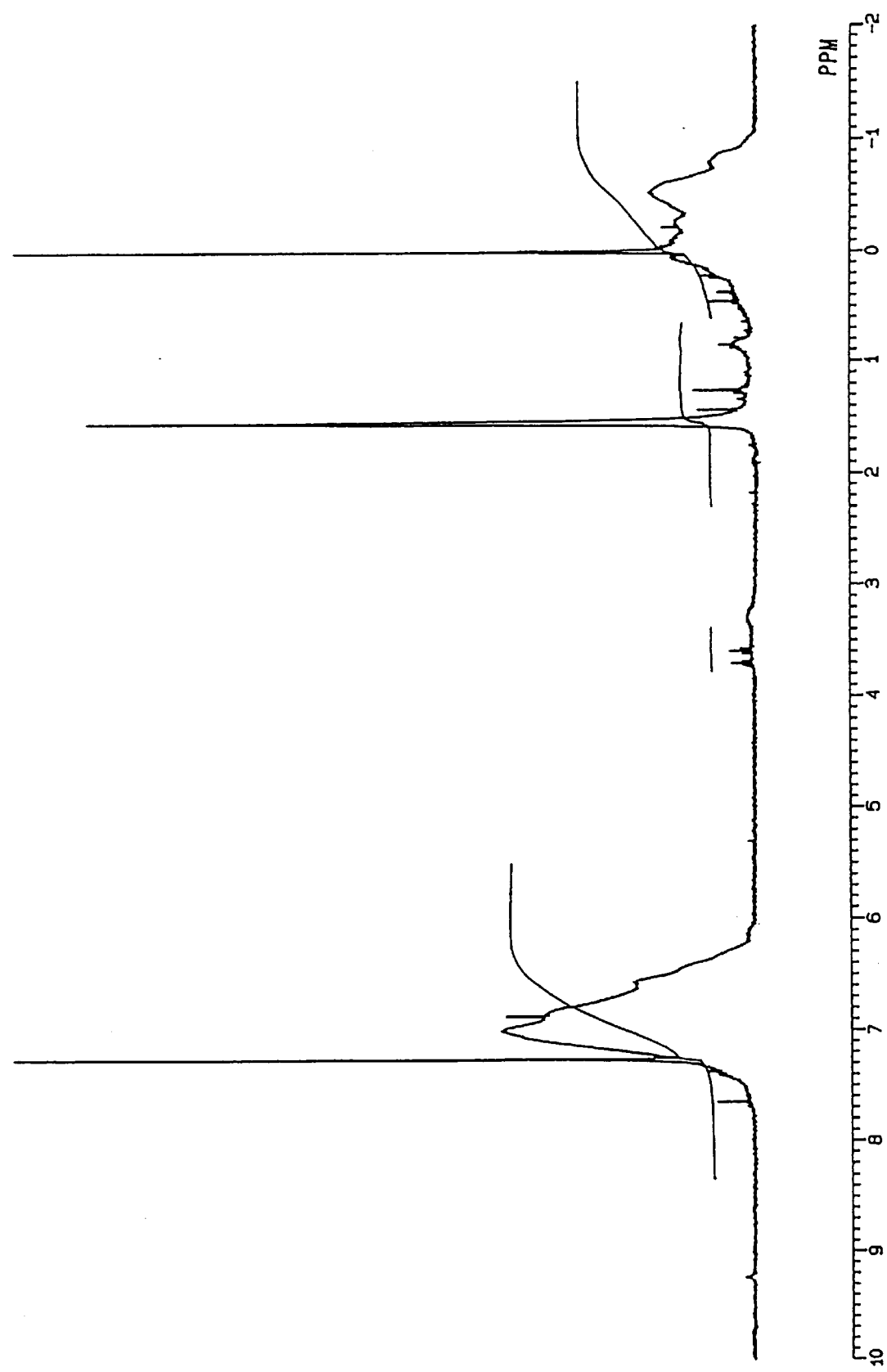
FIG. 10 is a $^1$H-NMR chart of the polysilane prepared in Example 40.
Figure 11:
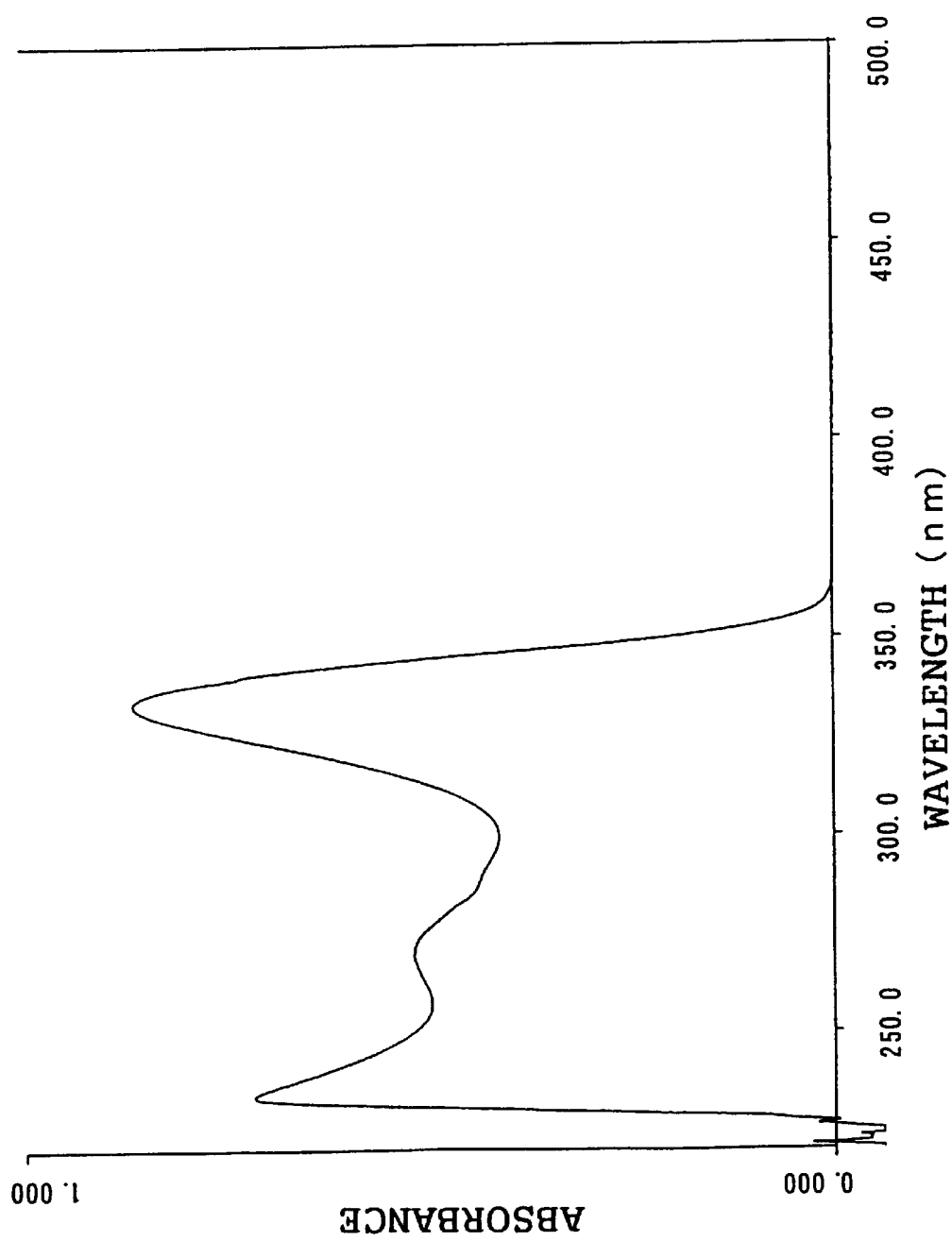
FIG. 11 is a UV chart of the polysilane prepared in Example 40.

A reaction was conducted in the same manner as in Example 27 with the exception of using the reaction product prepared in Example 19 as the polysilane chlorinated at both ends. The procedure gave a polysilane of 16,700 in weight average molecular weight (average degree of polymerization about 138) which had phenol groups introduced at both ends. FIGS. 10 and 11 show $^1$H-NMR and UV charts, respectively.

EXAMPLE 41

A reaction was conducted in the same manner as in Example 27 with the exception of using the reaction product prepared in Example 20 as the polysilane chlorinated at both ends. The procedure gave a polysilane of 19,000 in weight average molecular weight (average degree of polymerization about 158) which had phenol groups introduced at both ends.

EXAMPLE 42

Figure 12:
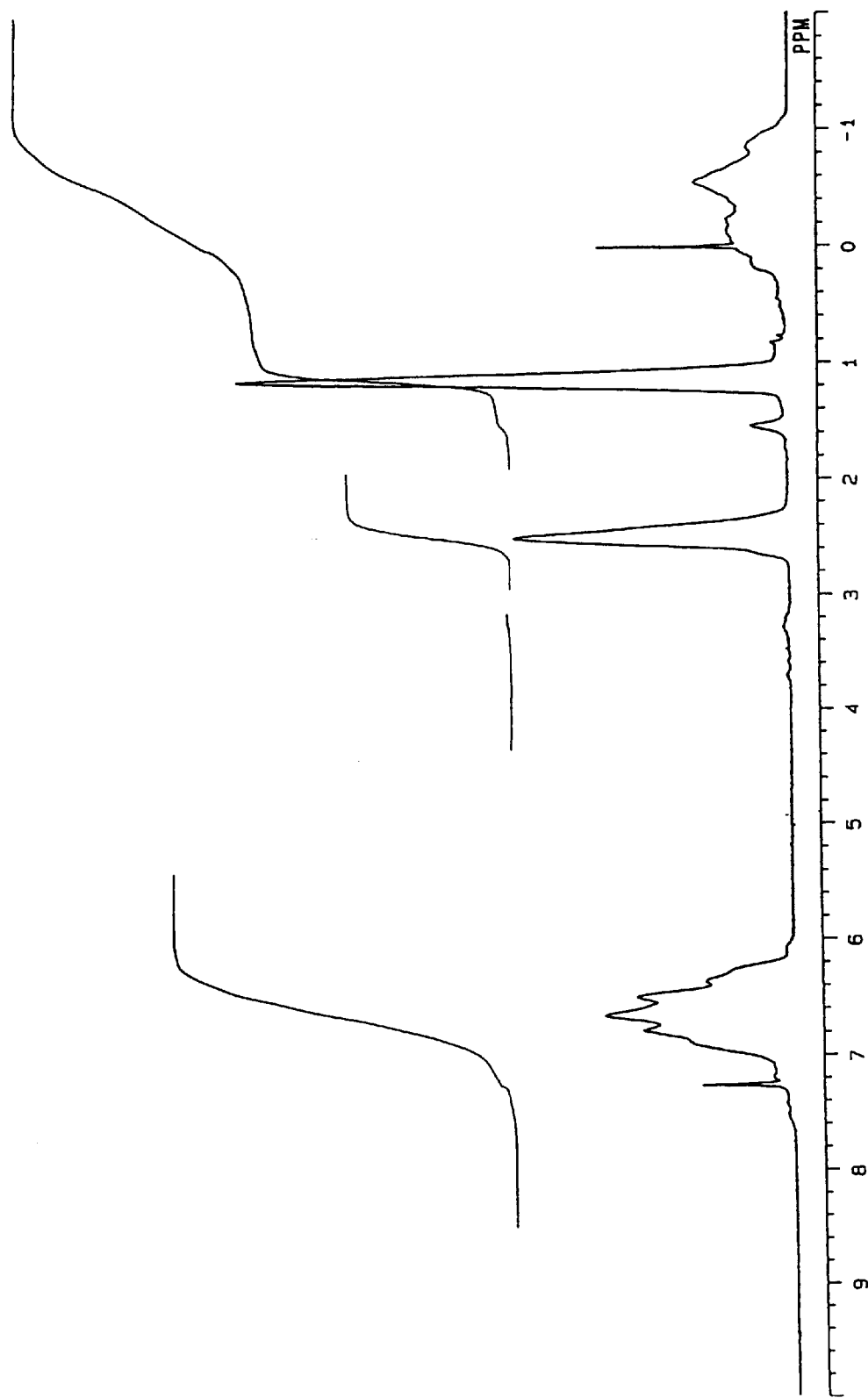
FIG. 12 is a $^1$H-NMR chart of the polysilane prepared in Example 42.
Figure 13:
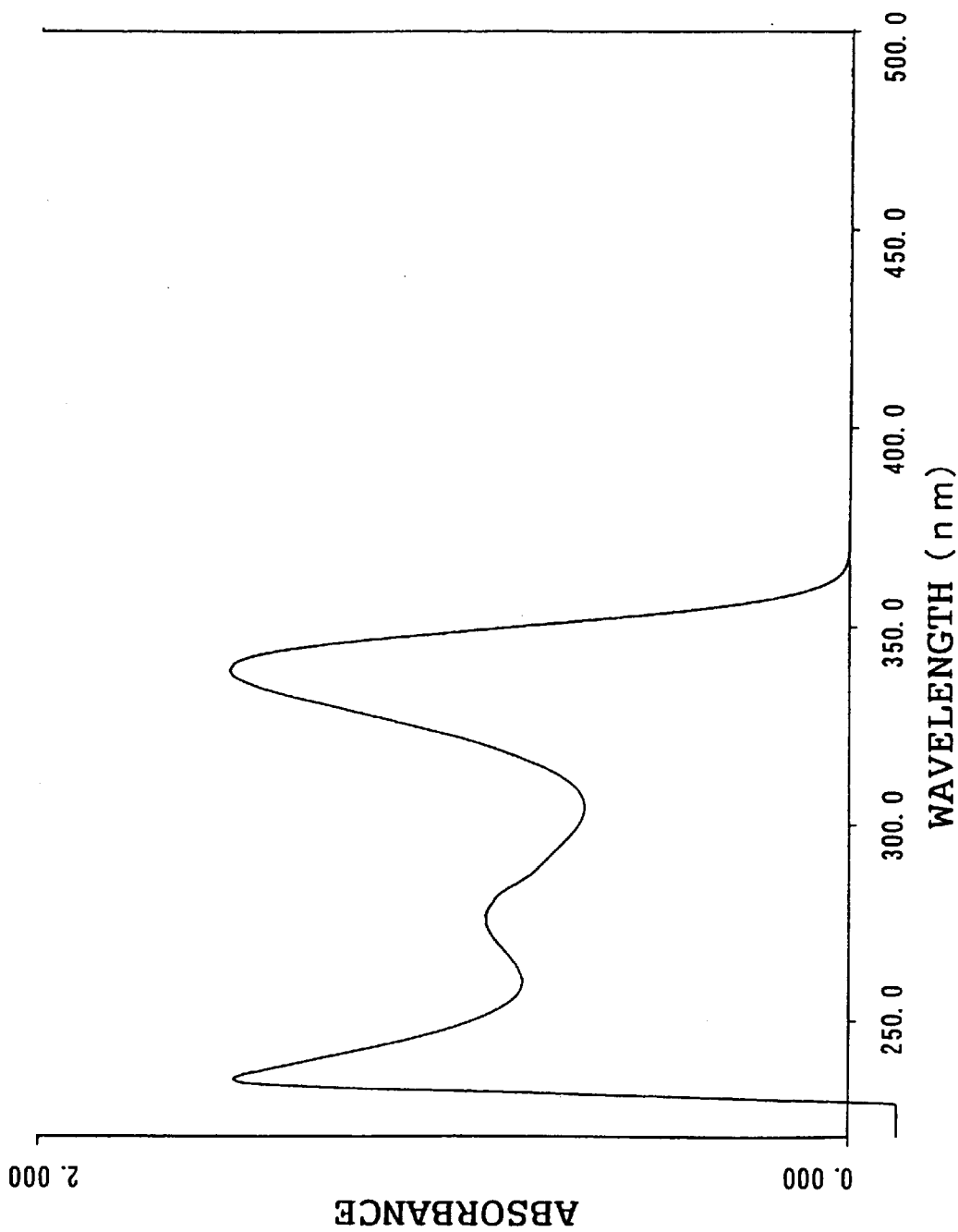
FIG. 13 is a UV chart of the polysilane prepared in Example 42.

A reaction was conducted in the same manner as in Example 27 with the exception of using the reaction product prepared in Example 23 as the polysilane chlorinated at both ends. The procedure gave a polysilane of 14,000 in weight average molecular weight (average degree of polymerization about 94) which had phenol groups introduced at both ends. FIGS. 12 and 13 show $^1$H-NMR and UV charts, respectively.

EXAMPLE 43

A reaction was conducted in the same manner as in Example 27 with the exception of using the reaction product prepared in Example 24 as the polysilane chlorinated at both ends. The procedure gave a polysilane with a weight average molecular weight of 20,800 (average degree of polymerization about 170) wherein phenol groups were introduced at both ends.

EXAMPLE 44

Figure 14:
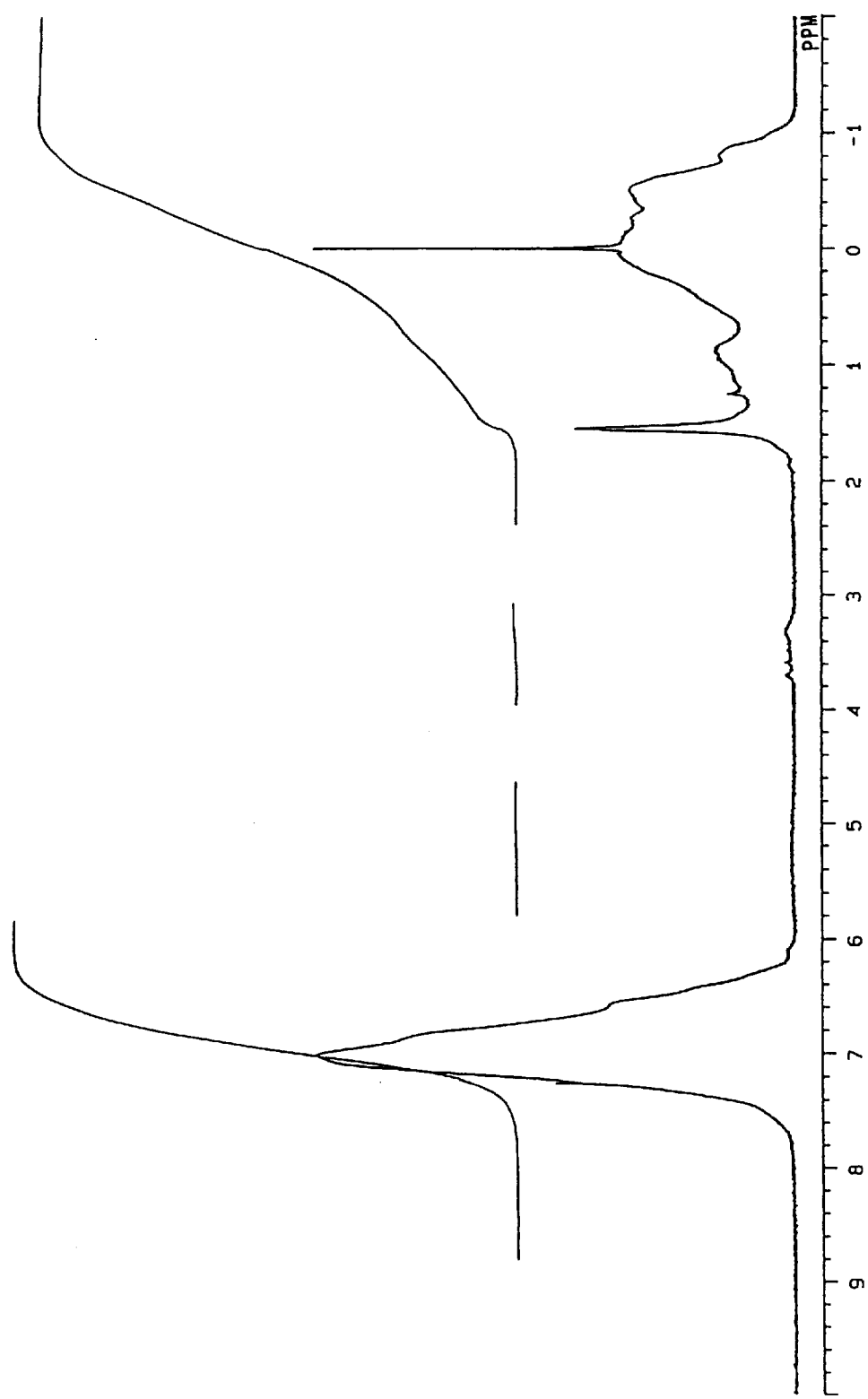
FIG. 14 is a $^1$H-NMR chart of the polysilane prepared in Example 44.

A reaction was conducted in the same manner as in Example 27 with the exception of using the reaction product prepared in Example 25 as the polysilane chlorinated at both ends. The procedure gave a polysilane with a weight average molecular weight of 16,300 (average degree of polymerization about 134) which had phenol groups introduced at both ends. FIGS. 14 and 15 show $^1$H-NMR and UV charts, respectively.

EXAMPLE 45

A reaction was conducted in the same manner as in Example 27 with the exception of using the reaction product prepared in Example 26 as the polysilane chlorinated at both ends. The procedure gave a polysilane with a weight average molecular weight of 9,900 (average degree of polymerization about 81) which had phenol groups introduced at both ends.

EXAMPLE 46

A reactor equipped with a dropping funnel, a reflux tube and a stirrer was charged with 15 g (0.65 mol) of sodium and 300 ml of dry toluene. After dry argon gas was introduced, 64 g (0.33 mol) of methylphenyldichlorosilane was added dropwise under reflux conditions (110° C.). After dropwise addition, reflux was continued for about 3 hours. After completion of the reaction, the supernatant was concentrated, whereby a polysilane was produced (Kipping method). The obtained polysilane had a weight average molecular weight of 47,500 (average degree of polymerization about 396).

The Grignard reaction and a deprotection reaction were conducted in the same manner as in Example 27 using the obtained polysilane. Phenol groups were introduced at both ends at a ratio of 35%.

What is claimed is:

1. A polysilane represented by the formula (1)

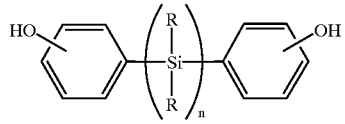

(1)

wherein R is hydrogen atom, alkyl group, aryl group, alkoxy group, amino group or silyl group; R's may be the same or at least two of them may be different from each other; each hydroxyl group is in the p-position or m-position; and n is 13 to 8,500.

2. A process for preparing a polysilane having phenol groups at both ends which is represented by the formula (1)

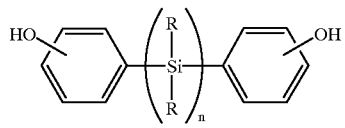

(1)

wherein R is hydrogen atom, alkyl group, aryl group, alkoxy group, amino group or silyl group; R's may be the same or at least two of them may be different from each other; each hydroxyl group is in the p-position or m-position; and n is 13 to 8,500, the process comprising the steps of (a) conducting the Grignard reaction between (i) a polysilane having halogen atoms at both ends which is represented by the formula (2)

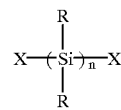

(2)

wherein R and n are as defined above; and X is halogen atom, and (ii) a Grignard reagent prepared by reacting magnesium with a hydroxyl-protected halogenated phenol represented by the formula (3)

(3)

wherein R is hydroxyl-protecting group, and represents alkyl group, alkoxyalkyl group, silyl group, acyl group, alkylthioalkyl group or alkylsulfoxy group; protected hydroxyl group is in the p-position or m-position; and $X_1$ is halogen atom, thereby producing a polysilane represented by the formula (4)

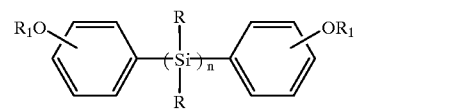

(4)

wherein R, $R_1$, the position of protected hydroxyl group and n are as defined above although variant depending on the starting materials; and (b) reacting the polysilane of the formula (4) with an acid.

3. The process according to claim 2 which is characterized in that the polysilane having halogen atoms at both ends which is represented by the formula (2)

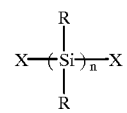

(2)

wherein R is hydrogen atom, alkyl group, aryl group, alkoxy group, amino group or silyl group; R's may be the same or at least two of them may be different from each other; n is 13 to 8,500; and X is halogen atom, is produced by subjecting to an electrode reaction a dihalosilane represented by the formula (5)

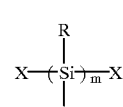

(5)

wherein m is 1 to 3; R is hydrogen atom, alkyl group, aryl group, alkoxy group, amino group or silyl group; 2 R's in the case of m=1, 4 R's in the case of m=2, or 6 R's in the case of m=3 may be the same or at least two of them may be different from each other; and X is halogen atom, using Mg or a Mg-based alloy as the anode, a lithium salt as a supporting electrolyte and an aprotic solvent as a solvent with or without use of a halogenated metal as a current carrying aid.

4. The process according to claim 2 which is characterized in that the polysilane having halogen atoms at both ends which is represented by the formula (2)

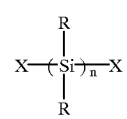

(2)

wherein R is hydrogen atom, alkyl group, aryl group, alkoxy group, amino group or silyl group; R's may be the same or at least two of them may be different from each other; n is 13 to 8,500; and X is halogen atom, is produced by reducing a dihalosilane represented by the formula (5)

(5)

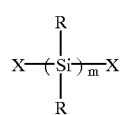

wherein m is 1 to 3; R is hydrogen atom, alkyl group, aryl group, alkoxy group, amino group or silyl group; 2 R's in the case of m=1, 4 R's in the case of m=2, or 6 R's in the case of m=3 may be the same or at least two of them may be different from each other; and X is halogen atom, using Mg or Mg-based alloy in an aprotic solvent in the presence of a lithium salt and a halogenated metal.

5. A polysilane represented by the formula (6)

(6)

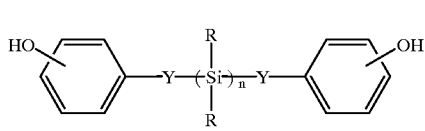

wherein R is hydrogen atom, alkyl group., aryl group, alkoxy group, amino group or silyl group; R's may be the same or at least two of them may be different from each other; Y is $CH_2$, $C_2H_4$, $C_3H_6$, $C_4H_8$, O or S; each hydroxyl group is in the p-position or m-position; and n is 13 to 8,500.

6. A process for preparing a polysilane having phenol groups at both ends which is represented by the formula (6)

(6)

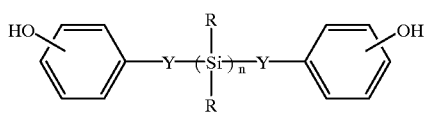

wherein R is hydrogen atom, alkyl group, aryl group, alkoxy group, amino group or silyl group; R's may be the same or at least two of them may be different from each other; Y is $CH_2$, $C_2H_4$, $C_3H_6$, $C_4H_8$, O or S; each hydroxyl group is in the p-position or m-position; and n is 13 to 8,500, the process comprising the steps of (a) conducting the Grignard reaction between (i) a polysilane having halogen atoms at both ends which is represented by the formula (2)

(2)

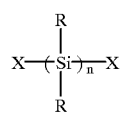

wherein R and n are as defined above; and X is halogen atom, and (ii) a Grignard reagent prepared by reacting magnesium with a hydroxyl-protected halogenated phenol derivative represented by the formula (7)

(7)

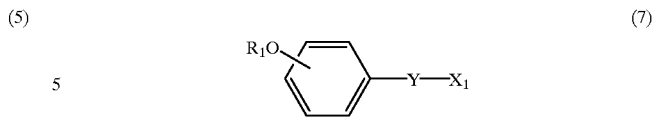

wherein $R_1$ is hydroxyl-protecting group, and represents alkyl group, alkoxyalkyl group, silyl group, acyl group, alkylthioalkyl group or alkylsulfoxy group; Y is $CH_2$, $C_2H_4$, $C_3H_6$, $C_4H_8$, O or S; protected hydroxyl group is in the p-position or m-position; and $X_1$ is halogen atom, thereby producing a polysilane represented by the formula (8)

(6)

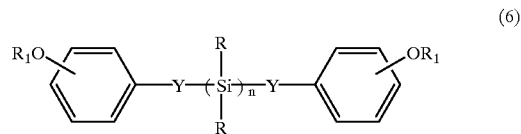

wherein R, $R_1$, Y, the position of protected hydroxyl group and n are as defined above although variant depending on the starting materials; and (b) reacting the obtained polysilane with an acid.

7. The process according to claim 6 which is characterized in that the polysilane having halogen atoms at both ends which is represented by the formula (2)

(2)

wherein R is hydrogen atom, alkyl group, aryl group, alkoxy group, amino group or silyl group; R's may be the same or at least two of them may be different from each other; n is 13 to 8,500; and X is halogen atom, is produced by subjecting to an electrode reaction a dihalosilane represented by the formula (5)

(5)

wherein m is 1 to 3; R is hydrogen atom, alkyl group, aryl group, alkoxy group, amino group or silyl group; 2 R's in the case of m=1, 4 R's in the case of m=2, or 6 R's in the case of m=3 may be the same or at least two of them may be different from each other; and X is halogen atom, using Mg or a Mg-based alloy as the anode, a lithium salt as a supporting electrolyte and an aprotic solvent as a solvent with or without use of a halogenated metal as a current carrying aid.

8. The process according to claim 6 which is characterized in that the polysilane having halogen atoms at both ends which is represented by the formula (2)

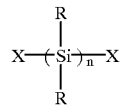

(2)

wherein R is hydrogen atom, alkyl group, aryl group, alkoxy group, amino group or silyl group; R's may be the same or at least two of them may be different from each other; n is 14 to 8,500; and X is halogen atom, is produced by reducing a dihalosilane represented by the formula (5)

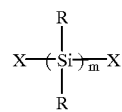

(5)

wherein m is 1 to 3; R is hydrogen atom, alkyl group, aryl group, alkoxy group, amino group or silyl group; 2 R's in the case of m=1, 4 R's in the case of m=2, or 6 R's in the case of m=3 may be the same or at least two of them may be different from each other; and X is halogen atom, using Mg or Mg-based alloy in an aprotic solvent in the presence of a lithium salt and a halogenated metal.

* * * * *